(12) United States Patent
Park et al.

(10) Patent No.: US 12,713,005 B2
(45) Date of Patent: Aug. 18, 2026

(54) IMAGE ENCODING/DECODING METHOD AND DEVICE, AND RECORDING MEDIUM ON WHICH BITSTREAM IS STORED

(71) Applicant: LG Electronics Inc., Seoul (KR)

(72) Inventors: Naeri Park, Seoul (KR); Jaehyun Lim, Seoul (KR); Sunmi Yoo, Seoul (KR); Junghak Nam, Seoul (KR); Hyeongmoon Jang, Seoul (KR); Jangwon Choi, Seoul (KR)

(73) Assignee: LG Electronics Inc., Seoul (KR)

( * ) Notice: Subject to any disclaimer, the term of this patent is extended or adjusted under 35 U.S.C. 154(b) by 9 days.

(21) Appl. No.: 18/726,662

(22) PCT Filed: Dec. 28, 2022

(86) PCT No.: PCT/KR2022/021532

§ 371 (c)(1),
(2) Date: Jul. 3, 2024

(87) PCT Pub. No.: WO2023/132556

PCT Pub. Date: Jul. 13, 2023

(65) Prior Publication Data

US 2025/0080720 A1 Mar. 6, 2025

Related U.S. Application Data

(60) Provisional application No. 63/296,419, filed on Jan. 4, 2022.

(51) Int. Cl.
*H04N 19/159* (2014.01)
*H04N 19/105* (2014.01)
(Continued)

(52) U.S. Cl.
CPC ......... *H04N 19/105* (2014.11); *H04N 19/159* (2014.11); *H04N 19/176* (2014.11); *H04N 19/70* (2014.11)

(58) Field of Classification Search
CPC .......................... H04N 19/105; H04N 19/159
See application file for complete search history.

(56) References Cited

U.S. PATENT DOCUMENTS 11,025,945 B2 * 6/2021 Park .................... H04N 19/513
11,632,564 B2 * 4/2023 Park .................... H04N 19/423
375/240.16

(Continued)

FOREIGN PATENT DOCUMENTS

KR 10-2020-0055124 5/2020
KR 10-2020-0066737 6/2020

(Continued)

OTHER PUBLICATIONS

International Search Report and Written Opinion in International Appln. No. PCT/KR2022/021532, mailed on Apr. 5, 2024, 10 pages (with partial English translation).

(Continued)

*Primary Examiner* — Irfan Habib
(74) *Attorney, Agent, or Firm* — Fish & Richardson P.C.

(57) ABSTRACT

An image encoding/decoding method and device according to the present disclosure can generate a candidate list of a current block, add an average candidate to the candidate list of the current block, and perform inter-prediction on the current block on the basis of the candidate list including the average candidate. Here, the candidate list includes a plurality of affine candidates, the plurality of affine candidates include at least one from among an inherited candidate, a constructed candidate, and a history-based candidate, and the average candidate can be generated on the basis of two affine candidates selected according to a predetermined priority from the candidate list.

12 Claims, 11 Drawing Sheets

(51) Int. Cl.
*H04N 19/176* (2014.01)
*H04N 19/70* (2014.01)

(56) References Cited

U.S. PATENT DOCUMENTS

2020/0244978 A1* 7/2020 Li .......................... H04N 19/52
2020/0296383 A1* 9/2020 Li .......................... H04N 19/52
2020/0296414 A1 9/2020 Park et al.
2020/0413047 A1 12/2020 Li et al.
2021/0029373 A1* 1/2021 Park ..................... H04N 19/423
2021/0092436 A1* 3/2021 Zhang .................. H04N 19/105
2021/0235109 A1 7/2021 Liu et al.
2021/0281859 A1 9/2021 Zhang et al.
2022/0070448 A1* 3/2022 Kim ..................... H04N 19/109
2022/0103810 A1* 3/2022 Park ..................... H04N 19/105
2022/0150472 A1* 5/2022 Park ..................... H04N 19/105
2022/0150473 A1* 5/2022 Park ....................... H04N 19/70
2023/0336773 A1* 10/2023 Zhao ...................... H04N 19/52
2023/0396789 A1* 12/2023 Piao ....................... H04N 19/46
2023/0412794 A1* 12/2023 Li ........................ H04N 19/105
2024/0040141 A1* 2/2024 Li ........................ H04N 19/513
2024/0129480 A1* 4/2024 Yang .................... H04N 19/119
2024/0314348 A1* 9/2024 Zhao .................... H04N 19/137
2025/0055976 A1* 2/2025 Park ..................... H04N 19/513
2025/0119528 A1* 4/2025 Lin ........................ H04N 19/11
2025/0175590 A1* 5/2025 Park ..................... H04N 19/105
2025/0317598 A1* 10/2025 Zhang .................. H04N 19/105
2025/0324083 A1* 10/2025 Deng ................... H04N 19/176
2026/0006208 A1* 1/2026 Kim ..................... H04N 19/137

FOREIGN PATENT DOCUMENTS

WO WO2020112451 * 6/2020 ........... H04N 19/153
WO 2020/263027 A1 12/2020
WO WO 2021/043166 3/2021

OTHER PUBLICATIONS

Extended European Search Report in European Appln. No. 22919093.9, mailed on Dec. 2, 2025, 9 pages.

* cited by examiner

FIG. 3

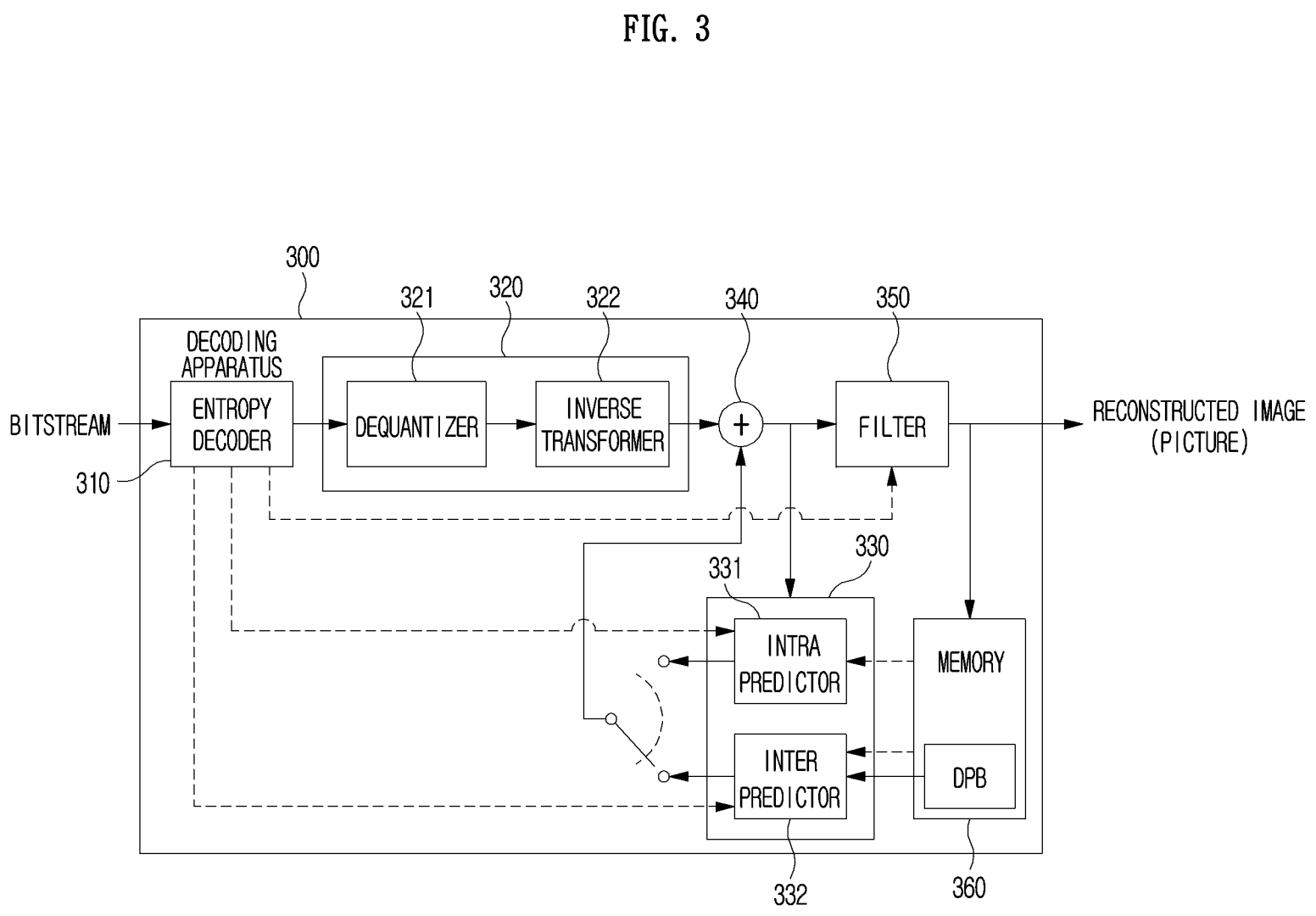

RECONSTRUCTED IMAGE (PICTURE)

BITSTREAM

DECODING APPARATUS

ENTROPY DECODER

DEQUANTIZER

INVERSE TRANSFORMER

FILTER

MEMORY

DPB

INTRA PREDICTOR

INTER PREDICTOR

300

310

320

321

322

330

331

332

340

350

360

IMAGE ENCODING/DECODING METHOD AND DEVICE, AND RECORDING MEDIUM ON WHICH BITSTREAM IS STORED

CROSS-REFERENCE TO RELATED APPLICATIONS

This application is a National Stage application under 35 U.S.C. § 371 of International Application No. PCT/KR2022/021532, filed on Dec. 28, 2022, which claims the benefit of U.S. Provisional Application No. 63/296,419, filed on Jan. 4, 2022. The disclosures of the prior applications are incorporated by reference in their entirety.

TECHNICAL FIELD

The present disclosure relates to an image encoding/decoding method and apparatus, and a recording medium storing a bitstream.

BACKGROUND

Recently, the demand for high-resolution and high-quality images such as HD (High Definition) images and UHD (Ultra High Definition) images has been increasing in various application fields, and accordingly, highly efficient image compression technologies are being discussed.

There are a variety of technologies such as inter-prediction technology that predicts a pixel value included in a current picture from a picture before or after a current picture with video compression technology, intra-prediction technology that predicts a pixel value included in a current picture by using pixel information in a current picture, entropy coding technology that allocates a short sign to a value with high appearance frequency and a long sign to a value with low appearance frequency, etc. and these image compression technologies may be used to effectively compress image data and transmit or store it.

SUMMARY

The present disclosure seeks to provide a method and apparatus for generating various affine candidates for an affine mode.

The present disclosure seeks to provide a method and apparatus for configuring/rearranging a candidate list for an affine mode.

The present disclosure seeks to provide a method and apparatus for configuring a candidate list based on a redundancy check between affine candidates.

The present disclosure seeks to provide a method and apparatus for deriving motion information of an affine candidate.

The present disclosure seeks to provide a method and apparatus for generating merge candidates for merge mode.

The present disclosure seeks to provide a method and apparatus for configuring/rearranging a candidate list for a merge mode.

The image decoding method and apparatus according to the present disclosure may generate a candidate list of the current block, add an average candidate to the candidate list, and perform inter prediction of the current block based on the candidate list including the average candidate. Here, the candidate list may include a plurality of affine candidates, and the plurality of affine candidates may include at least one of an inherited candidate, a constructed candidate, or a history-based candidate. The average candidate may be generated based on two affine candidates selected from the candidate list according to a predetermined priority order.

In the image decoding method and apparatus according to the present disclosure, when the selected two affine candidates have different types of affine models, the type of the affine model for the average candidate may be determined as the type of the affine model for any one of the selected two affine candidates.

The image decoding method and apparatus according to the present disclosure, a plurality of affine candidates belonging to the candidate list may be rearranged based on the type of the affine model for at least one of the plurality of affine candidates in the candidate list.

In the image decoding method and apparatus according to the present disclosure, the average candidate may be adaptively added to the candidate list based on at least one of the availability of the two affine candidates, whether the reference picture index between the two affine candidates is the same, or whether reference pictures between the two affine candidates are the same.

In the image decoding method and apparatus according to the present disclosure, the inherited candidate may be configured in the candidate list based on at least one of whether a spatial neighboring block of the current block is a block encoded in an affine mode, the number of inherited candidates already included in the candidate list, or the shape of the current block.

In the image decoding method and apparatus according to the present disclosure, the average candidate may be added to the candidate list based on a redundancy check with at least one of a plurality of affine candidates belonging to the candidate list, and the redundancy check may be performed based on the type of affine model for the average candidate.

In the image decoding method and apparatus according to the present disclosure, based on a template-based cost, rearrangement may be performed on at least one of the inherited candidate, the constructed candidate, or the average candidate included in the candidate list.

In the image decoding method and apparatus according to the present disclosure, motion information of the average candidate may be determined based on motion information of at least one of the selected two affine candidates, and the motion information may include at least one of a flag indicating whether to apply local illumination compensation or weight information for bidirectional weighted prediction.

The image decoding method and apparatus according to the present disclosure a candidate index of the current block may be obtained from a bitstream, and the candidate index may specify one of some affine candidates in the candidate list including the average candidate.

In the image decoding method and apparatus according to the present disclosure, the candidate list may further include a combined candidate. The combined candidate may be generated by combining motion information in the L0 prediction direction for any one of the plurality of affine candidates and motion information in the L1 prediction direction for another one of the plurality of affine candidates.

The image encoding method and apparatus according to the present disclosure may generate a candidate list of the current block, add an average candidate to the candidate list, and perform inter prediction of the current block based on the candidate list including the average candidate. Here, the candidate list may include a plurality of affine candidates, and the plurality of affine candidates may include at least one of an inherited candidate, a constructed candidate, or a history-based candidate. The average candidate may be generated based on two affine candidates selected from the candidate list according to a predetermined priority order.

A computer-readable digital storage medium storing encoded video/image information that causes performing the image decoding method by a decoding apparatus according to the present disclosure is provided.

A computer-readable digital storage medium storing video/image information generated according to the image encoding method according to the present disclosure is provided.

A method and apparatus for transmitting video/image information generated according to the image encoding method according to the present disclosure are provided.

According to the present disclosure, the accuracy and reliability of inter prediction can be improved by generating various affine candidates or merge candidates.

According to the present disclosure, the coding efficiency of the candidate index can be improved by constructing a candidate list through redundancy check and rearranging it.

According to the present disclosure, the reliability of the average candidate or the combined candidate can be increased and the accuracy of inter prediction can be improved by determining the target candidate for generating the average candidate or the combined candidate in consideration of the type of the affine model.

BRIEF DESCRIPTION OF THE DRAWINGS

FIG. 3 shows a schematic block diagram of a decoding apparatus to which an embodiment of the present disclosure is applicable and decoding of video/image signals is performed.

DETAILED DESCRIPTION

Figure 1:
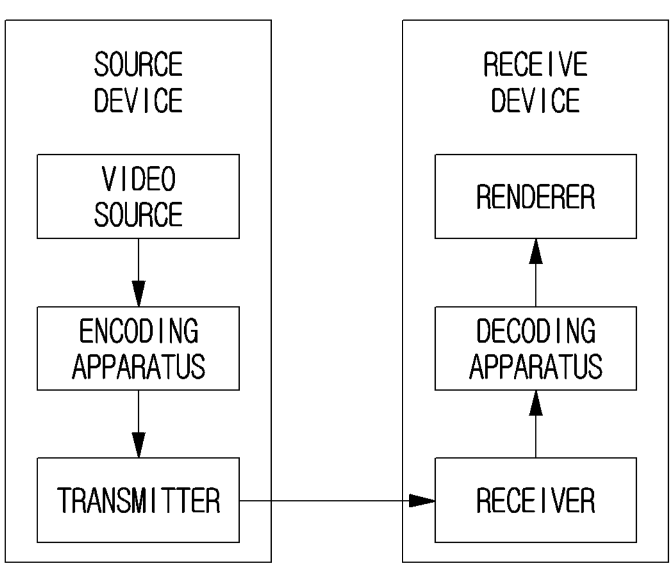
FIG. 1 shows a video/image coding system according to the present disclosure.

Since the present disclosure may make various changes and have several embodiments, specific embodiments will be illustrated in a drawing and described in detail in a detailed description. However, it is not intended to limit the present disclosure to a specific embodiment, and should be understood to include all changes, equivalents and substitutes included in the spirit and technical scope of the present disclosure. While describing each drawing, similar reference numerals are used for similar components.

A term such as first, second, etc. may be used to describe various components, but the components should not be limited by the terms. The terms are used only to distinguish one component from other components. For example, a first component may be referred to as a second component without departing from the scope of a right of the present disclosure, and similarly, a second component may also be referred to as a first component. A term of and/or includes any of a plurality of related stated items or a combination of a plurality of related stated items.

When a component is referred to as "being connected" or "being linked" to another component, it should be understood that it may be directly connected or linked to another component, but another component may exist in the middle. On the other hand, when a component is referred to as "being directly connected" or "being directly linked" to another component, it should be understood that there is no another component in the middle.

A term used in this application is just used to describe a specific embodiment, and is not intended to limit the present disclosure. Singular expressions include plural expressions unless the context clearly dictates otherwise. In this application, it should be understood that a term such as "include" or "have", etc. is intended to designate the presence of features, numbers, steps, operations, components, parts or combinations thereof described in the specification, but does not exclude in advance the possibility of presence or addition of one or more other features, numbers, steps, operations, components, parts or combinations thereof.

The present disclosure relates to video/image coding. For example, a method/an embodiment disclosed herein may be applied to a method disclosed in the versatile video coding (VVC) standard. In addition, a method/an embodiment disclosed herein may be applied to a method disclosed in the essential video coding (EVC) standard, the AOMedia Video 1 (AV1) standard, the 2nd generation of audio video coding standard (AVS2) or the next-generation video/image coding standard (ex.H.267 or H.268, etc.).

This specification proposes various embodiments of video/image coding, and unless otherwise specified, the embodiments may be performed in combination with each other.

Herein, a video may refer to a set of a series of images over time. A picture generally refers to a unit representing one image in a specific time period, and a slice/a tile is a unit that forms part of a picture in coding. A slice/a tile may include at least one coding tree unit (CTU). One picture may consist of at least one slice/tile. One tile is a rectangular area composed of a plurality of CTUs within a specific tile column and a specific tile row of one picture. A tile column is a rectangular area of CTUs having the same height as that of a picture and a width designated by a syntax requirement of a picture parameter set. A tile row is a rectangular area of CTUs having a height designated by a picture parameter set and the same width as that of a picture. CTUs within one tile may be arranged consecutively according to CTU raster scan, while tiles within one picture may be arranged consecutively according to raster scan of a tile. One slice may include an integer number of complete tiles or an integer number of consecutive complete CTU rows within a tile of a picture that may be included exclusively in a single NAL unit. Meanwhile, one picture may be divided into at least two sub-pictures. A sub-picture may be a rectangular area of at least one slice within a picture.

A pixel, a pixel or a pel may refer to the minimum unit that constitutes one picture (or image). In addition, 'sample' may be used as a term corresponding to a pixel. A sample may generally represent a pixel or a pixel value, and may represent only a pixel/a pixel value of a luma component, or only a pixel/a pixel value of a chroma component.

A unit may represent a basic unit of image processing. A unit may include at least one of a specific area of a picture and information related to a corresponding area. One unit may include one luma block and two chroma (ex. cb, cr) blocks. In some cases, a unit may be used interchangeably with a term such as a block or an area, etc. In a general case, a M×N block may include a set (or an array) of transform coefficients or samples (or sample arrays) consisting of M columns and N rows.

Herein, "A or B" may refer to "only A", "only B" or "both A and B." In other words, herein, "A or B" may be interpreted as "A and/or B." For example, herein, "A, B or C" may refer to "only A", "only B", "only C" or "any combination of A, B and C)".

A slash (/) or a comma used herein may refer to "and/or." For example, "A/B" may refer to "A and/or B." Accordingly, "A/B" may refer to "only A", "only B" or "both A and B." For example, "A, B, C" may refer to "A, B, or C".

Herein, "at least one of A and B" may refer to "only A", "only B" or "both A and B". In addition, herein, an expression such as "at least one of A or B" or "at least one of A and/or B" may be interpreted in the same way as "at least one of A and B".

In addition, herein, "at least one of A, B and C" may refer to "only A", "only B", "only C", or "any combination of A, B and C". In addition, "at least one of A, B or C" or "at least one of A, B and/or C" may refer to "at least one of A, B and C".

In addition, a parenthesis used herein may refer to "for example." Specifically, when indicated as "prediction (intra prediction)", "intra prediction" may be proposed as an example of "prediction". In other words, "prediction" herein is not limited to "intra prediction" and "intra prediction" may be proposed as an example of "prediction." In addition, even when indicated as "prediction (i.e., intra prediction)", "intra prediction" may be proposed as an example of "prediction."

Herein, a technical feature described individually in one drawing may be implemented individually or simultaneously.

FIG. 1 shows a video/image coding system according to the present disclosure.

Referring to FIG. 1, a video/image coding system may include a first device (a source device) and a second device (a receiving device).

A source device may transmit encoded video/image information or data in a form of a file or streaming to a receiving device through a digital storage medium or a network. The source device may include a video source, an encoding apparatus and a transmission unit. The receiving device may include a reception unit, a decoding apparatus and a renderer. The encoding apparatus may be referred to as a video/image encoding apparatus and the decoding apparatus may be referred to as a video/image decoding apparatus. A transmitter may be included in an encoding apparatus. A receiver may be included in a decoding apparatus. A renderer may include a display unit, and a display unit may be composed of a separate device or an external component.

A video source may acquire a video/an image through a process of capturing, synthesizing or generating a video/an image. A video source may include a device of capturing a video/an image and a device of generating a video/an image. A device of capturing a video/an image may include at least one camera, a video/image archive including previously captured videos/images, etc. A device of generating a video/an image may include a computer, a tablet, a smartphone, etc. and may (electronically) generate a video/an image. For example, a virtual video/image may be generated through a computer, etc., and in this case, a process of capturing a video/an image may be replaced by a process of generating related data.

An encoding apparatus may encode an input video/image. An encoding apparatus may perform a series of procedures such as prediction, transform, quantization, etc. for compression and coding efficiency. Encoded data (encoded video/image information) may be output in a form of a bitstream.

A transmission unit may transmit encoded video/image information or data output in a form of a bitstream to a reception unit of a receiving device through a digital storage medium or a network in a form of a file or streaming. A digital storage medium may include various storage media such as USB, SD, CD, DVD, Blu-ray, HDD, SSD, etc. A transmission unit may include an element for generating a media file through a predetermined file format and may include an element for transmission through a broadcasting/communication network. A reception unit may receive/extract the bitstream and transmit it to a decoding apparatus.

A decoding apparatus may decode a video/an image by performing a series of procedures such as dequantization, inverse transform, prediction, etc. corresponding to an operation of an encoding apparatus.

A renderer may render a decoded video/image. A rendered video/image may be displayed through a display unit.

Figure 2:
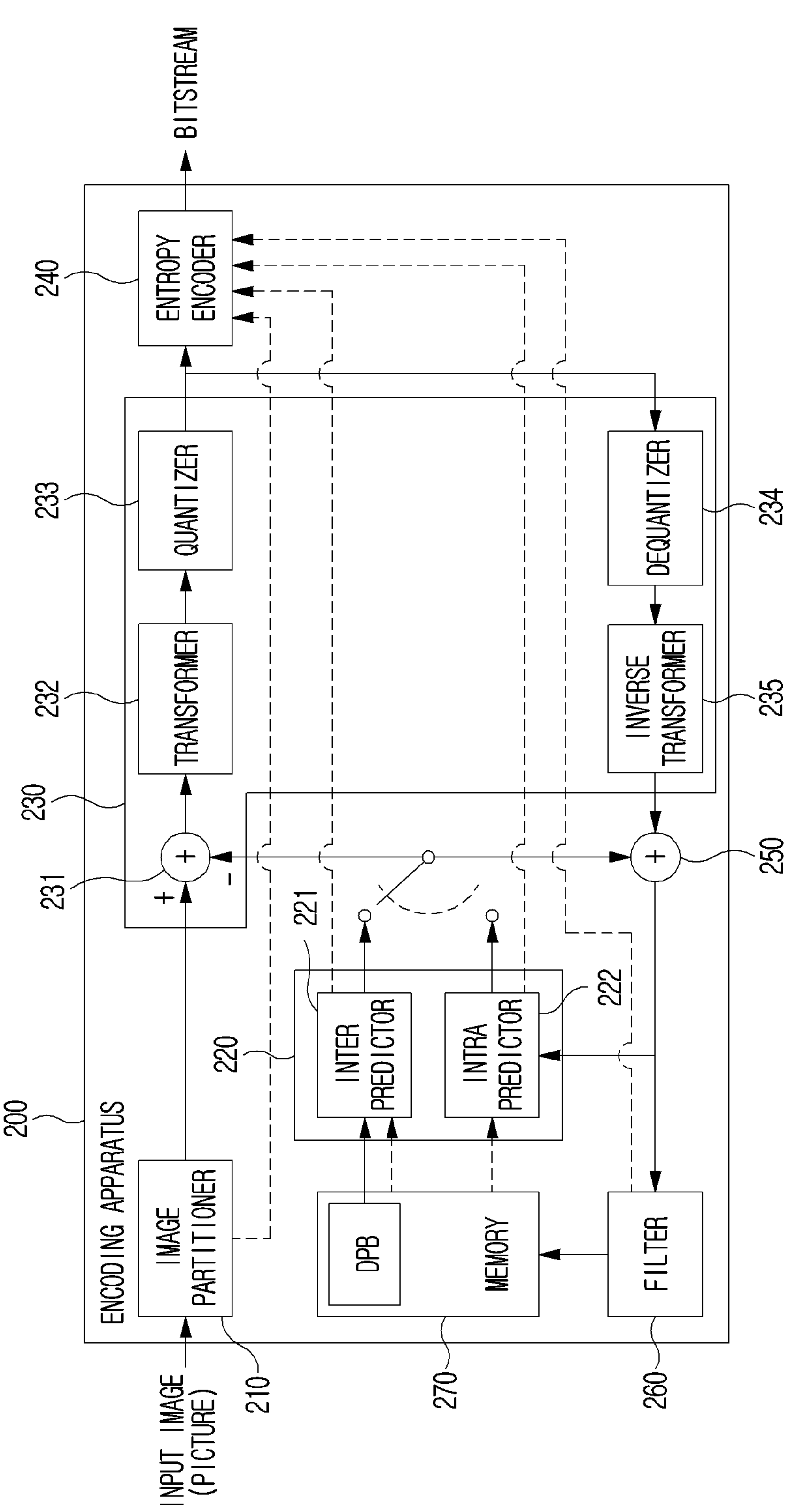
FIG. 2 shows a schematic block diagram of an encoding apparatus to which an embodiment of the present disclosure is applicable and encoding of video/image signals is performed.

FIG. 2 shows a rough block diagram of an encoding apparatus to which an embodiment of the present disclosure may be applied and encoding of a video/image signal is performed.

Referring to FIG. 2, an encoding apparatus 200 may be composed of an image partitioner 210, a predictor 220, a residual processor 230, an entropy encoder 240, an adder 250, a filter 260 and a memory 270. A predictor 220 may include an inter predictor 221 and an intra predictor 222. A residual processor 230 may include a transformer 232, a quantizer 233, a dequantizer 234 and an inverse transformer 235. A residual processor 230 may further include a subtractor 231. An adder 250 may be referred to as a reconstructor or a reconstructed block generator. The above-described image partitioner 210, predictor 220, residual processor 230, entropy encoder 240, adder 250 and filter 260 may be configured by at least one hardware component (e.g., an encoder chipset or a processor) according to an embodiment. In addition, a memory 270 may include a decoded picture buffer (DPB) and may be configured by a digital storage medium. The hardware component may further include a memory 270 as an internal/external component.

An image partitioner 210 may partition an input image (or picture, frame) input to an encoding apparatus 200 into at least one processing unit. As an example, the processing unit may be referred to as a coding unit (CU). In this case, a coding unit may be partitioned recursively according to a quad-tree binary-tree ternary-tree (QTBTTT) structure from a coding tree unit (CTU) or the largest coding unit (LCU).

For example, one coding unit may be partitioned into a plurality of coding units with a deeper depth based on a quad tree structure, a binary tree structure and/or a ternary structure. In this case, for example, a quad tree structure may be applied first and a binary tree structure and/or a ternary structure may be applied later. Alternatively, a binary tree structure may be applied before a quad tree structure. A coding procedure according to this specification may be performed based on a final coding unit that is no longer partitioned. In this case, based on coding efficiency, etc. according to an image characteristic, the largest coding unit may be directly used as a final coding unit, or if necessary, a coding unit may be recursively partitioned into coding units of a deeper depth, and a coding unit with an optimal size may be used as a final coding unit. Here, a coding procedure may include a procedure such as prediction, transform, and reconstruction, etc. described later.

As another example, the processing unit may further include a prediction unit (PU) or a transform unit (TU). In this case, the prediction unit and the transform unit may be divided or partitioned from a final coding unit described above, respectively. The prediction unit may be a unit of sample prediction, and the transform unit may be a unit for deriving a transform coefficient and/or a unit for deriving a residual signal from a transform coefficient.

In some cases, a unit may be used interchangeably with a term such as a block or an area, etc. In a general case, a M×N block may represent a set of transform coefficients or samples consisting of M columns and N rows. A sample may generally represent a pixel or a pixel value, and may represent only a pixel/a pixel value of a luma component, or only a pixel/a pixel value of a chroma component. A sample may be used as a term that makes one picture (or image) correspond to a pixel or a pel.

An encoding apparatus 200 may subtract a prediction signal (a prediction block, a prediction sample array) output from an inter predictor 221 or an intra predictor 222 from an input image signal (an original block, an original sample array) to generate a residual signal (a residual signal, a residual sample array), and a generated residual signal is transmitted to a transformer 232. In this case, a unit that subtracts a prediction signal (a prediction block, a prediction sample array) from an input image signal (an original block, an original sample array) within an encoding apparatus 200 may be referred to as a subtractor 231.

A predictor 220 may perform prediction on a block to be processed (hereinafter, referred to as a current block) and generate a predicted block including prediction samples for the current block. A predictor 220 may determine whether intra prediction or inter prediction is applied in a unit of a current block or a CU. A predictor 220 may generate various information on prediction such as prediction mode information, etc. and transmit it to an entropy encoder 240 as described later in a description of each prediction mode. Information on prediction may be encoded in an entropy encoder 240 and output in a form of a bitstream.

An intra predictor 222 may predict a current block by referring to samples within a current picture. The samples referred to may be positioned in the neighborhood of the current block or may be positioned a certain distance away from the current block according to a prediction mode. In intra prediction, prediction modes may include at least one nondirectional mode and a plurality of directional modes. A nondirectional mode may include at least one of a DC mode or a planar mode. A directional mode may include 33 directional modes or 65 directional modes according to a detail level of a prediction direction. However, it is an example, and more or less directional modes may be used according to a configuration. An intra predictor 222 may determine a prediction mode applied to a current block by using a prediction mode applied to a neighboring block.

An inter predictor 221 may derive a prediction block for a current block based on a reference block (a reference sample array) specified by a motion vector on a reference picture. In this case, in order to reduce the amount of motion information transmitted in an inter prediction mode, motion information may be predicted in a unit of a block, a sub-block or a sample based on the correlation of motion information between a neighboring block and a current block. The motion information may include a motion vector and a reference picture index. The motion information may further include inter prediction direction information (L0 prediction, L1 prediction, Bi prediction, etc.). For inter prediction, a neighboring block may include a spatial neighboring block existing in a current picture and a temporal neighboring block existing in a reference picture. A reference picture including the reference block and a reference picture including the temporal neighboring block may be the same or different. The temporal neighboring block may be referred to as a collocated reference block, a collocated CU (colCU), etc., and a reference picture including the temporal neighboring block may be referred to as a collocated picture (colPic). For example, an inter predictor 221 may configure a motion information candidate list based on neighboring blocks and generate information indicating which candidate is used to derive a motion vector and/or a reference picture index of the current block. Inter prediction may be performed based on various prediction modes, and for example, for a skip mode and a merge mode, an inter predictor 221 may use motion information of a neighboring block as motion information of a current block. For a skip mode, unlike a merge mode, a residual signal may not be transmitted. For a motion vector prediction (MVP) mode, a motion vector of a surrounding block is used as a motion vector predictor and a motion vector difference is signaled to indicate a motion vector of a current block.

A predictor 220 may generate a prediction signal based on various prediction methods described later. For example, a predictor may not only apply intra prediction or inter prediction for prediction for one block, but also may apply intra prediction and inter prediction simultaneously. It may be referred to as a combined inter and intra prediction (CIIP) mode. In addition, a predictor may be based on an intra block copy (IBC) prediction mode or may be based on a palette mode for prediction for a block. The IBC prediction mode or palette mode may be used for content image/video coding of a game, etc. such as screen content coding (SCC), etc. IBC basically performs prediction within a current picture, but it may be performed similarly to inter prediction in that it derives a reference block within a current picture. In other words, IBC may use at least one of inter prediction techniques described herein. A palette mode may be considered as an example of intra coding or intra prediction. When a palette mode is applied, a sample value within a picture may be signaled based on information on a palette table and a palette index. A prediction signal generated through the predictor 220 may be used to generate a reconstructed signal or a residual signal.

A transformer 232 may generate transform coefficients by applying a transform technique to a residual signal. For example, a transform technique may include at least one of Discrete Cosine Transform (DCT), Discrete Sine Transform (DST), Karhunen-Loève Transform (KLT), Graph-Based Transform (GBT) or Conditionally Non-linear Transform (CNT). Here, GBT refers to transform obtained from this graph when relationship information between pixels is expressed as a graph. CNT refers to transform obtained based on generating a prediction signal by using all previously reconstructed pixels. In addition, a transform process may be applied to a square pixel block in the same size or may be applied to a non-square block in a variable size.

A quantizer 233 may quantize transform coefficients and transmit them to an entropy encoder 240 and an entropy encoder 240 may encode a quantized signal (information on quantized transform coefficients) and output it as a bitstream. Information on the quantized transform coefficients may be referred to as residual information. A quantizer 233 may rearrange quantized transform coefficients in a block form into an one-dimensional vector form based on coefficient scan order, and may generate information on the quantized transform coefficients based on the quantized transform coefficients in the one-dimensional vector form.

An entropy encoder 240 may perform various encoding methods such as exponential Golomb, context-adaptive variable length coding (CAVLC), context-adaptive binary arithmetic coding (CABAC), etc. An entropy encoder 240 may encode information necessary for video/image reconstruction (e.g., a value of syntax elements, etc.) other than quantized transform coefficients together or separately.

Encoded information (ex. encoded video/image information) may be transmitted or stored in a unit of a network abstraction layer (NAL) unit in a bitstream form. The video/image information may further include information on various parameter sets such as an adaptation parameter set (APS), a picture parameter set (PPS), a sequence parameter set (SPS) or a video parameter set (VPS), etc. In addition, the video/image information may further include general constraint information. Herein, information and/or syntax elements transmitted/signaled from an encoding apparatus to a decoding apparatus may be included in video/image information. The video/image information may be encoded through the above-described encoding procedure and included in the bitstream. The bitstream may be transmitted through a network or may be stored in a digital storage medium. Here, a network may include a broadcasting network and/or a communication network, etc. and a digital storage medium may include various storage media such as USB, SD, CD, DVD, Blu-ray, HDD, SSD, etc. A transmission unit (not shown) for transmitting and/or a storage unit (not shown) for storing a signal output from an entropy encoder 240 may be configured as an internal/external element of an encoding apparatus 200, or a transmission unit may be also included in an entropy encoder 240.

Quantized transform coefficients output from a quantizer 233 may be used to generate a prediction signal. For example, a residual signal (a residual block or residual samples) may be reconstructed by applying dequantization and inverse transform to quantized transform coefficients through a dequantizer 234 and an inverse transformer 235. An adder 250 may add a reconstructed residual signal to a prediction signal output from an inter predictor 221 or an intra predictor 222 to generate a reconstructed signal (a reconstructed picture, a reconstructed block, a reconstructed sample array). When there is no residual for a block to be processed like when a skip mode is applied, a predicted block may be used as a reconstructed block. An adder 250 may be referred to as a reconstructor or a reconstructed block generator. A generated reconstructed signal may be used for intra prediction of a next block to be processed within a current picture, and may be also used for inter prediction of a next picture through filtering as described later. Meanwhile, luma mapping with chroma scaling (LMCS) may be applied in a picture encoding and/or reconstruction process.

A filter 260 may improve subjective/objective image quality by applying filtering to a reconstructed signal. For example, a filter 260 may generate a modified reconstructed picture by applying various filtering methods to a reconstructed picture, and may store the modified reconstructed picture in a memory 270, specifically in a DPB of a memory 270. The various filtering methods may include deblocking filtering, sample adaptive offset, adaptive loop filter, bilateral filter, etc. A filter 260 may generate various information on filtering and transmit it to an entropy encoder 240. Information on filtering may be encoded in an entropy encoder 240 and output in a form of a bitstream.

A modified reconstructed picture transmitted to a memory 270 may be used as a reference picture in an inter predictor 221. When inter prediction is applied through it, an encoding apparatus may avoid prediction mismatch in an encoding apparatus 200 and a decoding apparatus, and may also improve encoding efficiency.

A DPB of a memory 270 may store a modified reconstructed picture to use it as a reference picture in an inter predictor 221. A memory 270 may store motion information of a block from which motion information in a current picture is derived (or encoded) and/or motion information of blocks in a pre-reconstructed picture. The stored motion information may be transmitted to an inter predictor 221 to be used as motion information of a spatial neighboring block or motion information of a temporal neighboring block. A memory 270 may store reconstructed samples of reconstructed blocks in a current picture and transmit them to an intra predictor 222.

FIG. 3 shows a rough block diagram of a decoding apparatus to which an embodiment of the present disclosure may be applied and decoding of a video/image signal is performed.

Referring to FIG. 3, a decoding apparatus 300 may be configured by including an entropy decoder 310, a residual processor 320, a predictor 330, an adder 340, a filter 350 and a memory 360. A predictor 330 may include an inter predictor 331 and an intra predictor 332. A residual processor 320 may include a dequantizer 321 and an inverse transformer 321.

According to an embodiment, the above-described entropy decoder 310, residual processor 320, predictor 330, adder 340 and filter 350 may be configured by one hardware component (e.g., a decoder chipset or a processor). In addition, a memory 360 may include a decoded picture buffer (DPB) and may be configured by a digital storage medium. The hardware component may further include a memory 360 as an internal/external component.

When a bitstream including video/image information is input, a decoding apparatus 300 may reconstruct an image in response to a process in which video/image information is processed in an encoding apparatus of FIG. 2. For example, a decoding apparatus 300 may derive units/blocks based on block partition-related information obtained from the bitstream. A decoding apparatus 300 may perform decoding by using a processing unit applied in an encoding apparatus. Accordingly, a processing unit of decoding may be a coding unit, and a coding unit may be partitioned from a coding tree unit or the larget coding unit according to a quad tree structure, a binary tree structure and/or a ternary tree structure. At least one transform unit may be derived from a coding unit. And, a reconstructed image signal decoded and output through a decoding apparatus 300 may be played through a playback device.

A decoding apparatus 300 may receive a signal output from an encoding apparatus of FIG. 2 in a form of a bitstream, and a received signal may be decoded through an entropy decoder 310. For example, an entropy decoder 310 may parse the bitstream to derive information (ex. video/image information) necessary for image reconstruction (or picture reconstruction). The video/image information may further include information on various parameter sets such as an adaptation parameter set (APS), a picture parameter set (PPS), a sequence parameter set (SPS) or a video parameter set (VPS), etc. In addition, the video/image information may further include general constraint information. A decoding apparatus may decode a picture further based on information on the parameter set and/or the general constraint information. Signaled/received information and/or syntax elements described later herein may be decoded through the decoding procedure and obtained from the bitstream. For example, an entropy decoder 310 may decode information in a bitstream based on a coding method such as exponential Golomb encoding, CAVLC, CABAC, etc. and output a value of a syntax element necessary for image reconstruction and quantized values of a transform coefficient regarding a residual. In more detail, a CABAC entropy decoding method may receive a bin corresponding to each syntax element from a bitstream, determine a context model by using syntax element information to be decoded, decoding information of a surrounding block and a block to be decoded or information of a symbol/a bin decoded in a previous step, perform arithmetic decoding of a bin by predicting a probability of occurrence of a bin according to a determined context model and generate a symbol corresponding to a value of each syntax element. In this case, a CABAC entropy decoding method may update a context model by using information on a decoded symbol/bin for a context model of a next symbol/bin after determining a context model. Among information decoded in an entropy decoder 310, information on prediction is provided to a predictor (an inter predictor 332 and an intra predictor 331), and a residual value on which entropy decoding was performed in an entropy decoder 310, i.e., quantized transform coefficients and related parameter information may be input to a residual processor 320. A residual processor 320 may derive a residual signal (a residual block, residual samples, a residual sample array). In addition, information on filtering among information decoded in an entropy decoder 310 may be provided to a filter 350. Meanwhile, a reception unit (not shown) that receives a signal output from an encoding apparatus may be further configured as an internal/external element of a decoding apparatus 300 or a reception unit may be a component of an entropy decoder 310.

Meanwhile, a decoding apparatus according to this specification may be referred to as a video/image/picture decoding apparatus, and the decoding apparatus may be divided into an information decoder (a video/image/picture information decoder) and a sample decoder (a video/image/picture sample decoder). The information decoder may include the entropy decoder 310 and the sample decoder may include at least one of dequantizer 321, the inverse transformer 322, the adder 340, the filter 350, the memory 360, the inter predictor 332 and the intra predictor 331.

A dequantizer 321 may dequantize quantized transform coefficients and output transform coefficients. A dequantizer 321 may rearrange quantized transform coefficients into a two-dimensional block form. In this case, the rearrangement may be performed based on coefficient scan order performed in an encoding apparatus. A dequantizer 321 may perform dequantization on quantized transform coefficients by using a quantization parameter (e.g., quantization step size information) and obtain transform coefficients.

An inverse transformer 322 inversely transforms transform coefficients to obtain a residual signal (a residual block, a residual sample array).

A predictor 320 may perform prediction on a current block and generate a predicted block including prediction samples for the current block. A predictor 320 may determine whether intra prediction or inter prediction is applied to the current block based on the information on prediction output from an entropy decoder 310 and determine a specific intra/inter prediction mode.

A predictor 320 may generate a prediction signal based on various prediction methods described later. For example, a predictor 320 may not only apply intra prediction or inter prediction for prediction for one block, but also may apply intra prediction and inter prediction simultaneously. It may be referred to as a combined inter and intra prediction (CIIP) mode. In addition, a predictor may be based on an intra block copy (IBC) prediction mode or may be based on a palette mode for prediction for a block. The IBC prediction mode or palette mode may be used for content image/video coding of a game, etc. such as screen content coding (SCC), etc. IBC basically performs prediction within a current picture, but it may be performed similarly to inter prediction in that it derives a reference block within a current picture. In other words, IBC may use at least one of inter prediction techniques described herein. A palette mode may be considered as an example of intra coding or intra prediction. When a palette mode is applied, information on a palette table and a palette index may be included in the video/image information and signaled.

An intra predictor 331 may predict a current block by referring to samples within a current picture. The samples referred to may be positioned in the neighborhood of the current block or may be positioned a certain distance away from the current block according to a prediction mode. In intra prediction, prediction modes may include at least one nondirectional mode and a plurality of directional modes. An intra predictor 331 may determine a prediction mode applied to a current block by using a prediction mode applied to a neighboring block.

An inter predictor 332 may derive a prediction block for a current block based on a reference block (a reference sample array) specified by a motion vector on a reference picture. In this case, in order to reduce the amount of motion information transmitted in an inter prediction mode, motion information may be predicted in a unit of a block, a sub-block or a sample based on the correlation of motion information between a neighboring block and a current block. The motion information may include a motion vector and a reference picture index. The motion information may further include inter prediction direction information (L0 prediction, L1 prediction, Bi prediction, etc.). For inter prediction, a neighboring block may include a spatial neighboring block existing in a current picture and a temporal neighboring block existing in a reference picture. For example, an inter predictor 332 may configure a motion information candidate list based on neighboring blocks and derive a motion vector and/or a reference picture index of the current block based on received candidate selection information. Inter prediction may be performed based on various prediction modes, and the information on prediction may include information indicating an inter prediction mode for the current block.

An adder 340 may add an obtained residual signal to a prediction signal (a prediction block, a prediction sample array) output from a predictor (including an inter predictor 332 and/or an intra predictor 331) to generate a reconstructed signal (a reconstructed picture, a reconstructed block, a reconstructed sample array). When there is no residual for a block to be processed like when a skip mode is applied, a prediction block may be used as a reconstructed block.

An adder 340 may be referred to as a reconstructor or a reconstructed block generator. A generated reconstructed signal may be used for intra prediction of a next block to be processed in a current picture, may be output through filtering as described later or may be used for inter prediction of a next picture. Meanwhile, luma mapping with chroma scaling (LMCS) may be applied in a picture decoding process.

A filter 350 may improve subjective/objective image quality by applying filtering to a reconstructed signal. For example, a filter 350 may generate a modified reconstructed picture by applying various filtering methods to a reconstructed picture and transmit the modified reconstructed picture to a memory 360, specifically a DPB of a memory 360. The various filtering methods may include deblocking filtering, sample adaptive offset, adaptive loop filter, bilateral filter, etc.

The (modified) reconstructed picture stored in the DPB of the memory 360 can be used as a reference picture in the inter predictor 332. A memory 360 may store motion information of a block from which motion information in a current picture is derived (or decoded) and/or motion information of blocks in a pre-reconstructed picture. The stored motion information may be transmitted to an inter predictor 260 to be used as motion information of a spatial neighboring block or motion information of a temporal neighboring block. A memory 360 may store reconstructed samples of reconstructed blocks in a current picture and transmit them to an intra predictor 331.

Herein, embodiments described in a filter 260, an inter predictor 221 and an intra predictor 222 of an encoding apparatus 200 may be also applied equally or correspondingly to a filter 350, an inter predictor 332 and an intra predictor 331 of a decoding apparatus 300, respectively.

Figure 4:
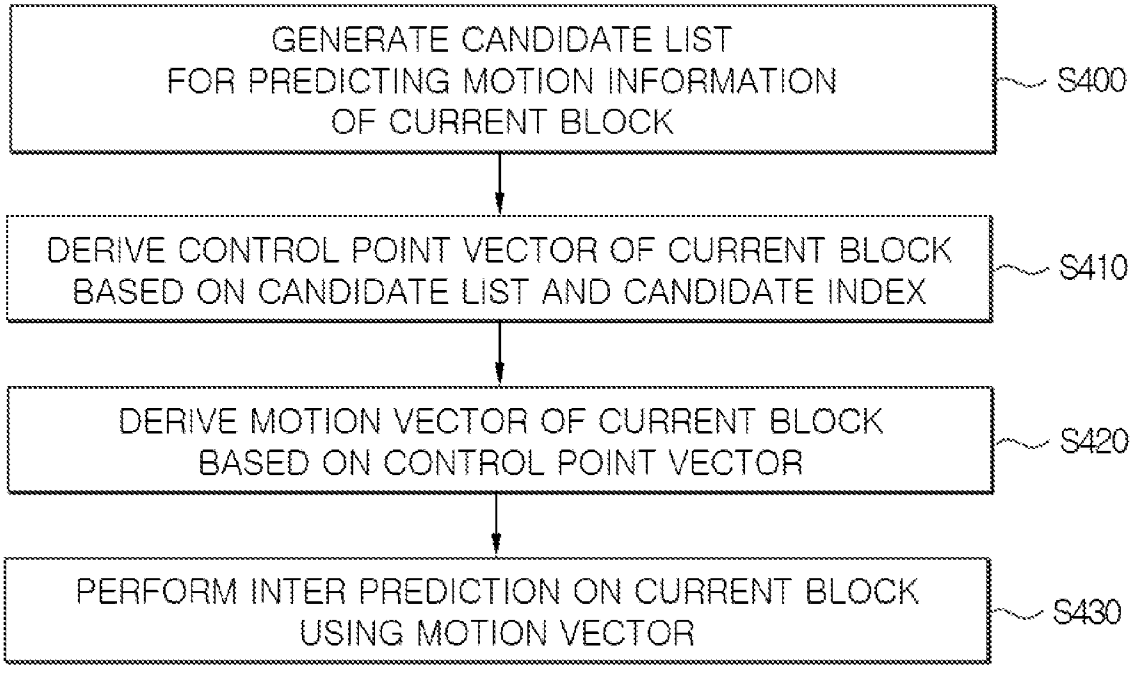
FIG. 4 shows an affine model-based inter prediction method performed by a decoding apparatus as an embodiment according to the present disclosure.

FIG. 4 shows an affine model-based inter prediction method performed by a decoding apparatus as an embodiment according to the present disclosure.

Referring to FIG. 4, a candidate list for predicting motion information of the current block may be generated (S400).

The candidate list may be for an affine merge mode in inter prediction using an affine model. However, it is not limited to this, and the candidate list may be for affine inter mode. Hereinafter, the affine mode may be interpreted as an affine merge mode or an affine inter mode.

The motion information may include at least one of a motion vector, a reference picture index, inter prediction direction information, weight information for bidirectional weighted prediction, or a flag indicating whether local illumination compensation is applied.

The candidate list may include one or more affine model-based candidates (hereinafter referred to as affine candidates). The affine candidate may refer to a candidate with a control point vector. The control point vector may refer to the motion vector of the control point for the affine model, and may be defined for each corner position of the block (e.g., the position of at least one of the top-left, top-right, bottom-left, or bottom-right corner).

The affine candidate may include at least one of a spatial candidate, a temporal candidate, or a constructed candidate. Here, the spatial candidate may be derived from a vector of a neighboring block spatially adjacent to the current block (hereinafter referred to as spatial neighboring block), and the temporal candidate may be derived from a vector of a neighboring block temporally adjacent to the current block (hereinafter referred to as temporal neighboring block). Here, the neighboring block may mean a block coded in the affine mode. The vector may mean a control point vector or a motion vector.

The method of deriving the spatial/temporal candidate based on the vector of the spatial/temporal neighboring block will be described in detail with reference to FIG. 5.

Meanwhile, the constructed candidate may be derived based on a combination of motion vectors of spatial/temporal neighboring blocks for the current block, where the neighboring blocks may not be blocks coded in the affine mode. Alternatively, at least one neighboring block may be a block coded in the affine mode. This will be described in detail with reference to FIG. 6.

The affine candidate may further include a history-based candidate. The motion information of the block decoded before the current block (hereinafter referred to as the previous block) may be sequentially stored in a buffer with a predetermined size according to the decoding order. The motion information of the previous block may be used as a candidate for deriving the motion information of the current block, and a candidate with the motion information of the previous block is called a history-based candidate. The previous block may be a neighboring block adjacent to the current block, or may be a neighboring block that is not adjacent to the current block.

The affine candidate may further include an average candidate.

The number of average candidates that can be generated may be determined based on at least one of the maximum number of affine candidates that can be included in the candidate list (MaxNumSubblockMergeCand) or the number of affine candidates already included in the candidate list. Here, the maximum number may be a fixed number defined equally for the encoding apparatus and the decoding apparatus. Alternatively, the maximum number may be variably determined based on the size of the candidate list or information indicating the maximum number of affine candidates that can be included in the candidate list. The information indicating the maximum number may be signaled at the level of at least one of a sequence parameter set, a picture parameter set, a picture header, a slice header, or a coding block.

For example, when the number of candidates already included in the candidate list is N and all of them are candidates generated using an affine model, the number of average candidates that can be included in the candidate list may be derived as Min (N*(N−1)/2, MaxNumSubblockMergeCand-N). Alternatively, the number of average candidates that can be included in the candidate list may be derived as Min (N*(N−1)/2, MaxNumSubblockMergeCand-N-P). Here, P may be an integer of 0, 1, 2, 3 or more. P may be a fixed value defined equally for the encoding apparatus and the decoding apparatus, or may be variably determined based on the number of candidates not generated using the affine model among candidates already included in the candidate list.

An average candidate may be generated based on two candidates in the candidate list, that is, Cand0 and Cand1. Cand0 may be one of the candidates already included in the candidate list, and Cand1 may be another one of the candidates already included in the candidate list. The Cand0 and Cand1 may be determined considering a predetermined priority order. As an example, the priority order is as shown in Table 1 below, which shows the combination of Cand0 and Cand1 to generate 10 average candidates as an example.

TABLE 1

| Idx | 0 | 1 | 2 | 3 | 4 | 5 | 6 | 7 | 8 | 9 |
|---|---|---|---|---|---|---|---|---|---|---|
| Cand0Idx | 0 | 0 | 1 | 0 | 1 | 2 | 0 | 1 | 2 | 3 |
| Cand1Idx | 1 | 2 | 2 | 3 | 3 | 3 | 4 | 4 | 4 | 4 |

Referring to Table 1, Idx may represent the priority order, and the smaller Idx, the higher the priority order. Cand0Idx and Cand1Idx may respectively mean the positions of candidates used to generate an average candidate within the candidate list. For example, in the order of 0 to 9, an average candidate may be generated based on Cand0 and Cand1 corresponding to the corresponding Idx. When Idx is 0, an average candidate may be generated based on a candidate (Cand0) with an index of 0 in the candidate list and a candidate (Cand1) with an index of 1 in the candidate list.

Through the above-described method, two target candidates for generating an average candidate may be determined. However, this is only an example, and the number and/or priority order of generated candidates may be changed.

Additionally, the two target candidates may be constrained to be selected from among the inherited candidate, the constructed candidate, and the history-based candidate. Here, the inherited candidate may include at least one of the spatial candidate or the temporal candidate described above. In this case, an average candidate may be generated based on two target candidates of different types. For example, one type of two target candidates may be an inherited candidate, and the other type may be a constructed candidate. Alternatively, one type of the two target candidates may be a constructed candidate, and the other type may be a history-based candidate. Alternatively, the average candidate may be constrained to be generated based on two target candidates of the same type. That is, the average candidate may be generated based on two target candidates that are inherited candidates, or may be generated based on two target candidates that are constructed candidates. Likewise, the average candidate may be constrained to be generated based on two target candidates, which are history-based candidates.

Alternatively, the two target candidates may be constrained to be selected within the inherited candidate and the constructed candidate, and not selected within the history-based candidate. In this case, as described above, the average candidate may be generated based on two target candidates of different types, or the average candidate may be constrained to be generated based on two target candidates of the same type.

Alternatively, the two target candidates may be selected from within the inherited candidate and the history-based candidate, and may be constrained to not be selected from within the constructed candidate. In this case, as described above, the average candidate may be generated based on two target candidates of different types, or the average candidate may be constrained to be generated based on two target candidates of the same type.

Alternatively, the two target candidates may be restricted to be selected within the constructed candidate and the history-based candidate, and not selected within the inherited candidate. In this case, as described above, the average candidate may be generated based on two target candidates of different types, or the average candidate may be constrained to be generated based on two target candidates of the same type.

Alternatively, the two target candidates may be constrained to be selected only within any one type of inherited candidate, constructed candidate, or history-based candidate. As an example, the two target candidates may be constrained to be selected only within inherited candidates. The two target candidates may be constrained to be selected only within the constructed candidates. The two target candidates may be constrained to be selected only within history-based candidates.

Meanwhile, there may be a case where the type of the affine model of one of the two target blocks is 4-parameter, and the type of the affine model of the other is 6-parameter. In this case, a method of generating an average candidate will be described.

When the two target candidates are both 4-parameter, the first control point vectors (cpMV[0]) and the second control point vectors (cpMV[1]) of the two target candidates may be averaged, respectively, and the type of affine model may be stored/propagated with 4-parameter. Likewise, when both target candidates are 6-parameter, the first control point vectors (cpMV[0]), the second control point vectors (cpMV [1]), and the third control point vectors (cpMV[2]) may be averaged, respectively, and the type of affine model may be stored/propagated with 6-parameter.

Specifically, when the type of the affine model for the two target candidates is 4-parameter, the first control point vectors (cpMV[0]) and the second control point vectors (cpMV[1) of the two target candidates]) may be averaged to calculate the first and second control point vectors of the average candidate, respectively. In this case, the type of affine model for the average candidate may be set to 4-parameter. When the average candidate is used to derive the control point vector of the current block, the type of the affine model for the average candidate may be stored in the current block and may be propagated to blocks after the current block. Likewise, when the type of the affine model for the two target candidates is all 6-parameter, the first control point vectors (cpMV[0]), second control point vectors (cpMV[1]), and third control point vectors of the two target candidates (cpMV[2]) may be averaged to calculate the first to third control point vectors of the average candidates, respectively. In this case, the type of the affine model of the average candidate may be set to 6-parameter. When the average candidate is used to derive the control point vector of the current block, the type of the affine model for the average candidate may be stored in the current block and may be propagated to blocks after the current block.

Alternatively, even when the type of the affine model for the two target candidates is 4-parameter, one of the two target candidates (Cand0) has first and second control point vectors, and the other (Cand1) may have first and third control point vectors. In this case, the first control point vector of the average candidate may be calculated as the average value of the first control point vector of Cand0 and the first control point vector of Cand1. The second control point vector of the average candidate may be set to the second control point vector of Cand0, or may be calculated as the average value of the second control point vector of Cand0 and the third control point vector of Cand1. Alternatively, a second control point vector may be derived based on the first control point vector and the third control point vector of Cand1, and the second control point of the average candidate may be the average value of the second control point vector of Cand0 and the pre-derived second control point vector of Cand1.

Alternatively, as described above, even if the type of the affine model for the two target candidates is 4-parameter, when one of the two target candidates (Cand0) has first and second control point vectors and the other one (Cand1) has first and third control point vectors, it may be restricted so that an average candidate is not generated based on these two target candidates.

When the types of affine models for two target candidates are different, the type of affine models may be stored/propagated as either 4-parameter or 6-parameter.

For example, when a target block with 4-parameter has a first control point vector and a second control point vector, a third control point vector may be derived using the first control point vector and the second control point vector. Alternatively, when a target block with 4-parameter has a first control point vector and a third control point vector, the second control point vector may be derived using the first control point vector and the third control point vector. Then, the first to third control point vectors of the average candidate may be calculated by averaging with the first to third control point vectors of other target candidate with 6-parameter, respectively. In this case, the type of the affine model of the average candidate may be set to 6-parameter. When the average candidate is used to derive the control point vector of the current block, the type of the affine model for the average candidate may be stored in the current block and may be propagated to blocks after the current block.

Alternatively, when the types of affine models for two target candidates are different, the type with a smaller number of parameters may be stored/propagated. That is, when the type of the affine model for Cand0 is 4-parameter and the type of the affine model for Cand1 is 6-parameter, the type of the affine model of the average candidate may be set to the same 4-parameter as the type of the affine model of Cand0. When the average candidate is used to derive the control point vector of the current block, the type of the affine model for the average candidate may be stored in the current block and may be propagated to blocks after the current block.

Alternatively, when the types of affine models for the two target candidates are different, if the difference of control point vectors between the two target candidates is less than a predetermined threshold, it may be stored/propagated as a 4-parameter, otherwise, it may be stored/propagated as a 6-parameter. Here, the difference of the control point vectors may mean the first difference between the first control point vector of Cand0 and the first control point vector of Cand1. The difference of the control point vectors may mean a second difference between the second control point vector of Cand0 and the second control point vector of Cand1. The difference of the control point vectors may mean a third difference between the third control point vector of Cand0 and the third control point vector of Cand1. The difference of the control point vectors may mean a fourth difference between the differential control point vector for Cand0 and the differential control point vector for Cand1. Here, the differential control point vector may be defined as at least one of (cpMV[0]-cpMV[1]), (cpMV[0]-cpMV[2]), (cpMV[1]-cpMV[2]), (cpMV[1]-cpMV[0]), (cpMV[2]-cpMV[0]), or (cpMV[2]-cpMV[1]).

Cand0 and Cand1 may not have a second control point vector. In this case, in order to calculate the difference of the above-described control point vectors, a second control point vector may be derived based on the first control point vector and the third control point vector of the target candidate. Likewise, Cand0 and Cand1 may not have a third control point vector, and in this case, the third control point vector may be derived based on the first and second control point vectors of the target candidate. The difference of the control point vectors may mean any one of the first difference, the second difference, the third difference, or the fourth difference, and may include at least two of the first to fourth differences. The threshold may be the pre-defined value equally for the encoding apparatus and the decoding apparatus.

Alternatively, it may be constrained to use only two target candidates with the same type of affine model. For example, two target candidates may be sequentially selected according to the above-described priority order, but when the selected two target candidates have the different types of affine models, an average candidate may not be generated based on the target candidates. On the other hand, when the selected two target candidates have the same type of affine model, an average candidate may be generated based on the target candidates.

Additionally, the affine candidates in the candidate list may be rearranged in consideration of the type of the affine model, and then an average candidate may be generated. When different types of affine models are mixed in the candidate list, generating average candidates sequentially according to the above-mentioned priority order without considering the type of affine model may lower the accuracy of the candidate. Therefore, before generating the average candidate, the affine candidates in the candidate list may be rearranged, and the average candidate may be generated based on the rearranged candidate list.

As an example, the candidate list may be rearranged by prioritizing the type of of affine model being 6-parameter. Alternatively, the candidate list may be rearranged by prioritizing the type of affine model being 4-parameter. Alternatively, the candidate list may be rearranged by prioritizing the type of the affine model of the first affine candidate in the candidate list. Here, the first affine candidate may refer to the candidate with the smallest index in the candidate list. Alternatively, the candidate list may be rearranged by prioritizing the most frequent type of affine model among the affine candidates in the candidate list.

An average candidate may be generated using only two target candidates with the same type of affine model from the rearranged candidate list. Alternatively, regardless of whether the two target candidates have the same type of affine model, an average candidate may be generated based on the two target candidates selected according to a predetermined priority order from the rearranged candidate list.

In the process of constructing a candidate list, various inheritance rules for each tool will be described.

When local illumination compensation (LIC) is applied to the current block, a flag (LIC_flag) indicating whether local illumination compensation is applied to the average candidate may be derived as follows.

When the LIC_flag of any of the two target candidates for generating the average candidate is TRUE, the LIC_flag for the average candidate may be stored/propagated as TRUE. When local illuminance compensation is constrained to apply only to blocks of unidirectional prediction, even if it is stored as TRUE according to the above-described inheritance rule, it may be changed to FALSE and stored/propagated. In the process of averaging two target candidates, as described later, when the two target candidates do not satisfy a specific condition (for example, when the target candidate is not available, when the reference picture indices or reference pictures between the two target candidates are different from each other), the control point vector of any one of the two target candidates may be stored. In this case, the LIC_flag of the average candidate may follow the LIC flag included in the motion information of any one of the two target candidates.

When bidirectional weighted prediction (Bi-prediction with CU-level Weights, BCW) is applied to the current block, weight information (BCW_index) for bidirectional weighted prediction for the average candidate may be derived as follows.

When two target candidates have motion information for bidirectional prediction and the BCW_index of each target candidate is the same, the BCW_index for the average candidate may be stored/propagated as the BCW_index of the target candidate. Otherwise, the BCW_index for the average candidate may be stored/propagated as a default value (e.g., 0). When BCW_index is the default value, the final prediction block may be generated by averaging the L0 prediction block and the L1 prediction block.

Alternatively, since the average candidate is a candidate newly generated through the average of two target candidates, LIC_flag and BCW_index of the average candidate may be set to FALSE and the default value, respectively, without inheritance from the target candidate.

The average candidate may be adaptively added/stored to the candidate list by considering the pre-defined specific condition. Here, the specific condition may include at least one of whether the target candidate is available (condition 1), whether the two target candidates have the same reference picture index (condition 2), or whether the two target candidates have the same reference picture (condition 3).

Hereinafter, for convenience of explanation, the two target candidates for generating the average candidate are referred to as the first target candidate (Cand0 [list] [idx]) and the second target candidate (Cand1 [list] [idx]). Here, the variable list has a value of 0 or 1 and may indicate any one of the L0 prediction direction or the L1 prediction direction. Additionally, when the type of the affine model for the two target candidates is 6-parameter, the variable idx has a value of 0 to 2, which may indicate the first to third control point vectors, respectively. When the type of the affine model for the two target candidates is 4-parameter, the variable idx has values of 0 and 1, which may indicate the first and second control point vectors, respectively.

Additionally, Avail0 [list] may indicate the availability of the first target candidate for each prediction direction, and Avail1[list] may indicate the availability of the second target candidate for each prediction direction. For example, when AvailX[0] is 1 (where X is 0 or 1), this may indicate that the target candidate is available for the L0 prediction direction. In other words, this may mean that the target candidate has motion information in the L0 prediction direction. Conversely, when AvailX[0] is 0, this may indicate that the target candidate is not available for the L0 prediction direction. In other words, this may mean that the target candidate does not have motion information in the L0 prediction direction. Likewise, when AvailX[1] is 1, this may indicate that the target candidate is available for the L1 prediction direction. In other words, this may mean that the target candidate has motion information in the L1 prediction direction. Conversely, when AvailX[1] is 0, this may indicate that the target candidate is not available for the L1 prediction direction. In other words, this may mean that the target candidate does not have motion information in the L1 prediction direction.

Additionally, ref_idx0[list] may represent the reference picture index of the first target candidate for each prediction direction, and ref_idx1[list] may represent the reference picture index of the second target candidate for each prediction direction.

(Condition 1) Availability of Target Candidate

Whether to average the two target candidates may be determined by considering the availability of the two target candidates. Whether to average may be determined for at least one of the L0 prediction direction or the L1 prediction direction.

Specifically, when the two target candidates are available for the L0 prediction direction (i.e., Avail0[0]=Avail1[0]=1), an average candidate may be generated based on the two target candidates. In this case, the control point vector in the L0 prediction direction for the average candidate may be calculated as the average value between the control point vector in the L0 prediction direction for the first target candidate and the control point vector in the L0 prediction direction for the second target candidate.

When only one of the two target candidates is available for the L0 prediction direction (i.e., when Avail0[0]=1 & Avail1[0]=0 or when Avail0[0]-0 & Avail1[0]=1), an average candidate may not be generated based on the two target candidates. That is, the control point vector in the L0 prediction direction for the average candidate may not be calculated as the average value between the control point vector in the L0 prediction direction for the first target candidate and the control point vector in the L0 prediction direction for the second target candidate. Instead, the control point vector of the L0 prediction direction for the average candidate may be set/stored as the control point vector of the L0 prediction direction of the target candidate available for the L0 prediction direction.

The above-described method may be equally applied to the L1 prediction direction. That is, whether to average the two target candidates may be determined based on whether the two target candidates are available for the L1 prediction direction.

When two target candidates are available for the L1 prediction direction (i.e., Avail0[1]=Avail1[1]=1), an average candidate may be generated based on the two target candidates. On the other hand, when only one of the two target candidates is available for the L1 prediction direction (i.e., when Avail0[1]=1 & Avail1[1]=0 or when Avail0[1]-0 & Avail1[1]=1), an average candidate may not be generated based on the two target candidates. Instead, the control point vector of the L1 prediction direction for the average candidate may be set/stored as the control point vector of the L1 prediction direction of the target candidate available for the L1 prediction direction.

(Condition 2) Whether the Two Target Candidates have the Same Reference Picture Index Whether to average the two target candidates may be determined based on whether the two target candidates have the same reference picture index for each prediction direction. Whether to average may be determined for at least one of the L0 prediction direction or the L1 prediction direction.

Specifically, when the reference picture indices in the L0 prediction direction for two target candidates are the same (i.e., ref_idx0[0]=ref_idx1 [0]), an average candidate may be generated based on the two target candidates. In this case, the control point vector in the L0 prediction direction for the average candidate may be calculated as the average value between the control point vector in the L0 prediction direction for the first target candidate and the control point vector in the L0 prediction direction for the second target candidate.

When the reference picture indices in the L0 prediction direction for two target candidates are different from each other (i.e., ref_idx0[0]≠ref_idx1 [0]), an average candidate may not be generated based on the two target candidates. That is, the control point vector in the L0 prediction direction for the average candidate may not be calculated as the average value between the control point vector in the L0 prediction direction for the first target candidate and the control point vector in the L0 prediction direction for the second target candidate. Instead, the control point vector in the L0 prediction direction for the average candidate may be set/stored as the control point vector in the L0 prediction direction for any one of the two target candidates. Here, one of the two target candidates may mean a candidate (i.e., Cand0) whose index of the candidate list is smaller among the two target candidates. Alternatively, one of the two target candidates may mean a candidate whose reference picture index is smaller among the two target candidates.

The above-described method may be equally applied to the L1 prediction direction. That is, whether to average the two target candidates may be determined based on whether the reference picture index in the L1 prediction direction for the first target candidate is the same as the reference picture index in the L1 prediction direction for the second target candidate.

When the reference picture indices in the L1 prediction direction for two target candidates are the same (i.e., ref_idx0[1]=ref_idx1 [1]), an average candidate may be generated based on the two target candidates. On the other hand, when the reference picture indices in the L1 prediction direction for the two target candidates are different (i.e., ref_idx0[1]≠ref_idx1 [1]), the average candidate may not be generated based on the two target candidates. Instead, the control point vector in the L1 prediction direction for the average candidate may be set/stored as the control point vector in the L1 prediction direction for any one of the two target candidates.

(Condition 3) Whether the Two Target Candidates have the Same Reference Picture

Whether to average the two target candidates may be determined based on whether the two target candidates have the same reference picture for each prediction direction. Whether two reference pictures are the same may be checked through output order information (picture order count, POC) assigned to each of the two reference pictures. That is, when the difference of output order information between two reference pictures is 0, the two reference pictures may be the same reference picture. Otherwise, the two reference pictures may not be the same reference picture. Whether to average may be determined for at least one of the L0 prediction direction or the L1 prediction direction.

Specifically, when the difference of output order information (POCref0[Cand0]) of the reference picture in the L0 prediction direction for the first target candidate and output order information (POCref0[Cand1]) of the reference picture in the L0 prediction direction for the second target candidate is 0, an average candidate may be generated based on the two target candidates. In this case, the control point vector in the L0 prediction direction for the average candidate may be calculated as the average value between the control point vector in the L0 prediction direction for the first target candidate and the control point vector in the L0 prediction direction for the second target candidate.

When the difference of POCref0[Cand0] and POCref0 [Cand1] is not 0, the average candidate may not be generated based on the two target candidates. That is, the control point vector in the L0 prediction direction for the average candidate may not be calculated as the average value between the control point vector in the L0 prediction direction for the first target candidate and the control point vector in the L0 prediction direction for the second target candidate. Instead, the control point vector in the L0 prediction direction for the average candidate may be set/stored as the control point vector in the L0 prediction direction for any one of the two target candidates. Here, one of the two target candidates may mean a candidate (i.e., Cand0) whose index of the candidate list is smaller among the two target candidates. Alternatively, one of the two target candidates may mean a candidate whose reference picture index is smaller among the two target candidates. Alternatively, one of the two target candidates may mean a candidate with a smaller difference from the output order information of the current picture to which the current block belongs among the two target candidates.

The above-described method may be equally applied to the L1 prediction direction. That is, whether to average the two target candidates may be determined based on whether the difference between the output order information (POCref1 [Cand0]) of the reference picture in the L1 prediction direction for the first target candidate and the output order information (POCref1 [Cand1]) of the reference picture in the L1 prediction direction for the second target candidate is 0.

Specifically, when the difference between POCref1 [Cand0] and POCref1 [Cand1] is 0, an average candidate may be generated based on the two target candidates. In this case, the control point vector in the L1 prediction direction for the average candidate may be calculated as the average value between the control point vector in the L1 prediction direction for the first target candidate and the control point vector in the L1 prediction direction for the second target candidate. On the other hand, when the difference between POCref1 [Cand0] and POCref1[Cand1] is not 0, an average candidate may not be generated based on the two target candidates. Instead, the control point vector in the L1 prediction direction for the average candidate may be set/stored as the control point vector in the L1 prediction direction for any one of the two target candidates.

Only when the condition pre-defined in the decoding apparatus are satisfied, an average candidate may be generated based on two target candidates and added to the candidate list. Here, the pre-defined condition may be any one of the above-mentioned (Condition 1) to (Condition 3). Alternatively, the pre-defined condition may include at least two of the above-mentioned (Condition 1) to (Condition 3).

When a plurality of conditions are defined in the decoding apparatus, it may be determined whether the conditions are satisfied sequentially according to a predetermined priority order. For example, when (Condition 1) and (Condition 2) are defined in the decoding apparatus, it may be determined whether the two target candidates satisfy (Condition 1) first, and only when (Condition 1) is satisfied, it may be determined whether the two target candidates satisfy (Condition 2). Alternatively, it may be simultaneously determined whether the two target candidates satisfy (Condition 1) and (Condition 2).

Only when an average candidate is generated based on two target candidates for each prediction direction, the average candidate may be added to the candidate list. Alternatively, when the above-mentioned conditions are satisfied for any one of the L0 and L1 prediction directions and an average candidate is generated based on the two target candidates, the average candidate may be added to the candidate list.

The affine candidate may include a combined candidate. A combined candidate may be generated by combining two target candidates (Cand0, Cand1) included in the candidate list. The combined candidate may be generated by combining motion information in the first prediction direction of Cand0 and motion information in the second prediction direction of Cand1. Here, the first prediction direction may be one of the L0 prediction direction or the L1 prediction direction, and the second prediction direction may be the other of the L0 prediction direction or the L1 prediction direction.

The combined candidate may be independently defined as an affine candidate for an affine mode and may be used together with the average candidate described above. Alternatively, in configuring the candidate list, any one of a combined candidate or an average candidate may be selectively used, and the combined candidate may replace the average candidate.

TABLE 2

| Idx | 0 | 1 | 2 | 3 | 4 | 5 | 6 | 7 | 8 | 9 | 10 | 11 | 12 | 13 | 14 |
|---|---|---|---|---|---|---|---|---|---|---|---|---|---|---|---|
| CandL0[candNum] | 0 | 1 | 0 | 2 | 1 | 2 | 0 | 3 | 1 | 3 | 2 | 3 | 0 | 4 | 1 |
| CandL1[candNum] | 1 | 0 | 2 | 0 | 2 | 1 | 3 | 0 | 3 | 1 | 3 | 2 | 4 | 0 | 4 |
| **Idx** | **15** | **16** | **17** | **18** | **19** | **20** | **21** | **22** | **23** | **24** | **25** | **26** | **27** | **28** | **29** |
| CandL0[candNum] | 4 | 2 | 4 | 3 | 4 | 0 | 5 | 1 | 5 | 2 | 5 | 3 | 5 | 4 | 5 |
| CandL1[candNum] | 1 | 4 | 2 | 4 | 3 | 5 | 0 | 5 | 1 | 5 | 2 | 5 | 3 | 5 | 4 |

Referring to Table 2, Idx may indicate the priority order of combination, and a combined candidate may be generated based on the two target candidates corresponding to Idx. For example, when Idx is 0, the combined candidate may be generated by combining the motion information in the L0 prediction direction of the merge candidate with an index of 0 in the candidate list and the motion information in the L1 prediction direction of the merge candidate with an index of 1 in the candidate list.

The combined candidate may be generated when the types of affine models for the specified two target candidates are the same.

Alternatively, When the types of affine models for two target candidates are different, the type of affine models may be stored/propagated as either 4-parameter or 6-parameter.

when a target block with 4-parameter has a first control point vector and a second control point vector, a third control point vector may be derived using the first control point vector and the second control point vector. Alternatively, when a target block with 4-parameter has a first control point vector and a third control point vector, the second control point vector may be derived using the first control point vector and the third control point vector. Then, the combined candidate may be generated through combination with other target candidate with 6-parameter. In this case, the type of the affine model of the combined candidate may be set to 6-parameter. When the combined candidate is used to derive the control point vector of the current block, the type of the affine model for the combined candidate may be stored in the current block and may be propagated to blocks after the current block.

Alternatively, when the types of affine models for two target candidates are different, the type with a smaller number of parameters may be stored/propagated. That is, when the type of the affine model for Cand0 is 4-parameter and the type of the affine model for Cand1 is 6-parameter, the type of the affine model of the combined candidate may be set to the same 4-parameter as the type of the affine model of Cand0. When the combined candidate is used to derive the control point vector of the current block, the type of the affine model for the combined candidate may be stored in the current block and may be propagated to blocks after the current block.

Alternatively, when the types of affine models for the two target candidates are different, if the difference of control point vectors between the two target candidates is less than a predetermined threshold, it may be stored/propagated as a 4-parameter, otherwise, it may be stored/propagated as a 6-parameter. Here, the difference of the control point vectors may mean the first difference between the first control point vector of Cand0 and the first control point vector of Cand1. The difference of the control point vectors may mean a second difference between the second control point vector of Cand0 and the second control point vector of Cand1. The difference of the control point vectors may mean a third difference between the third control point vector of Cand0 and the third control point vector of Cand1. The difference of the control point vectors may mean a fourth difference between the differential control point vector for Cand0 and the differential control point vector for Cand1. Here, the differential control point vector may be defined as at least one of (cpMV[0]-cpMV[1]), (cpMV[0]-cpMV[2]), (cpMV[1]-cpMV[2]), (cpMV[1]-cpMV[0]), (cpMV[2]-cpMV[0]), or (cpMV[2]-cpMV[1]).

Cand0 and Cand1 may not have a second control point vector. In this case, in order to calculate the difference of the above-described control point vectors, a second control point vector may be derived based on the first control point vector and the third control point vector of the target candidate. Likewise, Cand0 and Cand1 may not have a third control point vector, and in this case, the third control point vector may be derived based on the first and second control point vectors of the target candidate. The difference of the control point vectors may mean any one of the first difference, the second difference, the third difference, or the fourth difference, and may include at least two of the first to fourth differences. The threshold may be the pre-defined value equally for the encoding apparatus and the decoding apparatus.

Alternatively, it may be constrained to use only two target candidates with the same type of affine model. For example, two target candidates may be sequentially selected according to the above-described priority order, but when the selected two target candidates have the different types of affine models, the combined candidate may not be generated based on the target candidates. On the other hand, when the selected two target candidates have the same type of affine model, the combined candidate may be generated based on the target candidates.

Additionally, the affine candidates in the candidate list may be rearranged in consideration of the type of the affine model, and then the combined candidate may be generated. When different types of affine models are mixed in the candidate list, generating the combined candidates sequentially according to the above-mentioned priority order without considering the type of affine model may lower the accuracy of the candidate. Therefore, before generating the combined candidate, the affine candidates in the candidate list may be rearranged, and the combined candidate may be generated based on the rearranged candidate list.

As an example, the candidate list may be rearranged by prioritizing the type of of affine model being 6-parameter. Alternatively, the candidate list may be rearranged by prioritizing the type of affine model being 4-parameter. Alternatively, the candidate list may be rearranged by prioritizing the type of the affine model of the first affine candidate in the candidate list. Here, the first affine candidate may refer to the candidate with the smallest index in the candidate list. Alternatively, the candidate list may be rearranged by prioritizing the most frequent type of affine model among the affine candidates in the candidate list.

Additionally, embodiments of the method for generating an average candidate may be applied identically/similarly to generating a combined candidate, and detailed description will be omitted.

The candidate list may further include a candidate with a zero motion vector (hereinafter referred to as a zero candidate). The zero candidate may be added to the candidate list after rearrangement of the affine candidates, which will be described later. Alternatively, rearrangement of the affine candidates may be performed after the candidate with the zero motion vector is added to the candidate list.

A plurality of affine candidates described above may be arranged in the candidate list based on a predetermined priority. For example, a plurality of affine candidates may be arranged in the candidate list in the order of inherited candidate, constructed candidate, average candidate, and zero candidate. Alternatively, a plurality of affine candidates may be arranged in the candidate list in the order of inherited candidate, average candidate, constructed candidate, and zero candidate. Alternatively, the inherited candidate may be divided into a spatial candidate and a temporal candidate. In this case, a plurality of affine candidates may be arranged in the candidate list in the order of spatial candidate, average candidate, temporal candidate, constructed candidate, and zero candidate.

In order to generate various average candidates, various affine candidates need to be included in the candidate list. To this end, prior to generating the average candidate, the configuration method and number of inherited candidates and/or constructed candidates may be changed. That is, changes in the configuration method and number of inherited candidates and/or constructed candidates may be applied when an average candidate is added to the candidate list. However, it is not limited to this and may be applied independently regardless of whether the average candidate is used.

In the process of configuring an inherited candidate, two inherited candidates may be configured using one block encoded in an affine mode among the left neighboring blocks adjacent to the current block and one block encoded in an affine mode among the top neighboring blocks adjacent to the current block. Alternatively, in order to configure more various inherited candidates and increase the number of average candidates that can be generated, two or more blocks encoded in affine mode from each of the left neighboring blocks and the top neighboring blocks may be used. To this end, the check order of neighboring blocks may be changed as shown in Table 2 below. The checking order of the neighboring blocks may mean the order in which inherited candidates derived based on the neighboring blocks are inserted into the candidate list.

TABLE 3

| |
|---|
| Case 1: A1, B1, B0, A0, B2 |
| Case 2: B1, A1, B0, A0, B2 |
| Case 3: A1, B1, B0, A0, (if Num < 4, B2) |
| Case 4: B1, A1, B0, A0, (if Num < 4, B2) |
| Case 5: w > h ? A1, B1, B0, A0, B2:B1, A1, B0, A0, B2 |
| Case 6: w > h ? A1, B1, B0, A0, (if Num < 4, B2):B1, A1, B0, A0, (if Num < 4, B2) |

In Table 3, A0 may refer to the bottom-left neighboring block, A1 may refer to the left neighboring block, B0 may refer to the top-right neighboring block, B1 may refer to the top neighboring block, and B2 may refer to the top-left neighboring block. For example, assuming that the coordinates of the top-left sample of the current block are $(x, y)$ and the width and height of the current block are w and h, respectively, A0 may refer to a neighboring block including a sample of $(x-1, y+h)$ coordinates, A1 may refer to a neighboring block including a sample of $(x-1, y+h-1)$ coordinates, B0 may refer to a neighboring block including a sample of $(x+w, y-1)$ coordinates, B1 may refer to a neighboring block including a sample of $(x+w-1, y-1)$, and B2 may refer to a neighboring block including a sample of $(x-1, y-1)$ coordinates.

For the five neighboring blocks, it may be checked whether the neighboring block is a block encoded in affine mode in the order according to Case 1 or Case 2, and a candidate list may be configured based on the block encoded in affine mode.

Alternatively, a candidate list may be configured by checking whether the neighboring block is a block encoded in affine mode in the order according to Case 3 or Case 4. However, whether to check B2 may be determined by considering the number of affine candidates already included in the candidate list.

Alternatively, a different check order may be applied depending on the shape of the current block, such as Case 5 or Case 6. For example, when the width of the current block is greater than the height, the check order of A1, B1, B0, A0, B2 may be applied, and when the width of the current block is less than or equal to the height, the check order of B1, A1, B0, A0, B2 may be applied. Conversely, when the width of the current block is greater than the height, the check order of B1, A1, B0, A0, B2 may be applied, and when the width of the current block is less than or equal to the height, the check order of A1, B1, B0, A0, B2 may be applied.

Alternatively, when the ratio of the width and height of the current block is greater than the predetermined threshold, the check order of A1, B1, B0, A0, B2 may be applied, and when the ratio of the width and height of the current block is less than or equal to the predetermined threshold, the check order of B1, A1, B0, A0, B2 may be applied. Conversely, when the ratio of the width and height of the current block is greater than the predetermined threshold, the check order of B1, A1, B0, A0, B2 may be applied, and when the ratio of the width and height of the current block is less than or equal to the predetermined threshold, the check order of A1, B1, B0, A0, B2 may be applied.

The above-described embodiment assumes that up to 5 neighboring blocks are available. However, depending on the shape or the ratio of width and height of the current block, at least one of the 5 neighboring blocks may be set as unavailable. In this case, the above-described check process may be omitted for the unavailable neighboring block.

In the process of configuring the constructed candidate, a method of using spatial/temporal neighboring blocks adjacent to each control point of the current block will be described.

Hereinafter, B2 may refer to the top-left neighboring block, B3 may refer to the top neighboring block, and A2 may refer to the left neighboring block. B2, B3, and A2 may be adjacent to the first control point corresponding to the top-left corner of the current block. B1 may refer to the top neighboring block, and B0 may refer to the top-right neighboring block. B1 and B0 may be adjacent to the second control point corresponding to the top-right corner of the current block. A1 may refer to the left neighboring block and A0 may refer to the bottom-left neighboring block. A1 and A0 may be adjacent to the third control point corresponding to the bottom-left corner of the current block. TO may be a temporal neighboring block and may be temporally adjacent to the fourth control point corresponding to the bottom-right corner of the current block.

As an example, assume that the coordinates of the top-left sample of the current block are (x, y), and the width and height of the current block are w and h, respectively. In this case, B2 may refer to a neighboring block including a sample of (x−1, y−1) coordinates, B3 may refer to a neighboring block including a sample of (x, y−1) coordinates, and A2 may refer to a neighboring block including a sample of (x−1, y) coordinates. Additionally, B1 may refer to a neighboring block including a sample of (x+w−1, y−1) coordinates, and B0 may refer to a neighboring block including a sample of (x+w, y−1) coordinates. In addition, A1 may refer to a neighboring block including a sample of (x−1, y+h−1) coordinates, and A0 may refer to a neighboring block including a sample of (x−1, y+h) coordinates. TO may refer to a neighboring block including a sample of (x+w, y+h) coordinates.

Spatial/temporal neighboring blocks of the current block may be divided into a plurality of groups. For convenience of explanation, it is assumed that spatial/temporal neighboring blocks of the current block are divided into four groups. The four groups may be representative of a first group consisting of at least one of B2, B3, or A2, a second group consisting of at least one of B1 or B0, a third group consisting of at least one of A1 or A0, and a fourth group consisting of TO. However, it is not limited to this, and of course, it may be divided into two or three groups of the four groups described later.

For each group, one or more neighboring blocks belonging to each group may be sequentially searched according to a predetermined search order to derive a control point vector corresponding to each control point. The search may be performed until one available motion vector is derived. That is, when even one available motion vector is derived during the search process, the search may be terminated early. Alternatively, the search may be performed until all available motion vectors are derived from all neighboring blocks belonging to each group. In this case, one or more motion vectors may be derived for each group.

For example, in the case of the first group, one or more available motion vectors may be derived by performing a search in the order of B2, B3, and A2. In the case of the second group, one or more available motion vectors may be derived by performing a search in the order of B1 and B0. In the case of the third group, one or more available motion vectors may be derived by performing a search in the order of A1 and A0. A constructed candidate may be generated using motion vectors derived for each group. Alternatively, a constructed candidate may be generated using only motion vectors with the same reference picture index among the motion vectors derived for each group. Alternatively, a constructed candidate may be generated using only motion vectors with the same reference picture among the motion vectors derived for each group.

Neighboring blocks with the same reference picture index may be extracted from each group, and a constructed candidate may be generated based on the motion vectors of the extracted neighboring blocks.

For example, as in Case 1 or Case 2 in Table 4, the neighboring block with the reference picture index of 0 and the neighboring block with the reference picture index of 1 may be derived for each group according to a predetermined search order. In this case, when the neighboring blocks with the reference picture index of 0 are B2, B1, A1, TO, the constructed candidates may be generated based on a combination of at least two of the motion vector of B2 (cpMV[0]), the motion vector of B1 (cpMV[1]), the motion vector of A1 (cpMV[2]), or the motion vector of TO (cpMV[3]). That is, the constructed candidate may include at least one of (cpMV[0], cpMV[1], cpMV[2]), (cpMV[0], cpMV[1], cpMV[3]), (cpMV[0], cpMV[2], cpMV[3]), (cpMV[1], cpMV[2], cpMV[3]), (cpMV[0], cpMV[1]), (cpMV[0], cpMV[2]), (cpMV[0], cpMV[3]), (cpMV[1], cpMV[2]), (cpMV[1], cpMV[3]), or (cpMV[2], cpMV[3]). Through the same method, a constructed candidate may be generated based on the motion vector of the neighboring block with the reference picture index of 1, and a detailed description will be omitted.

In this way, the constructed candidate may be generated based on motion vectors of neighboring blocks having the same reference picture index, and this constructed candidate may be generated for each reference picture index.

TABLE 4

|  |
|---|
| Case 1: the constructed candidate is configured for each reference picture index by checking the neighboring block with the reference picture index of 0 in the order of (B2 -> B3 -> A2), (B1 -> B0), (A1 -> A0), and T0 among the spatial/temporal neighboring blocks adjacent to each control point and checking the neighboring block with the reference picture index of 1 in the same method. |
| Case 2: the constructed candidate is configured for each reference picture index by checking the neighboring block with the reference picture index of 0 in the order of (B2 -> A2 -> B3), (B0 -> B1), (A0 -> A1), and T0 among the spatial/temporal neighboring blocks adjacent to each control point and checking the neighboring block with the reference picture index of 1 in the same method. |

In the above embodiment, the reference picture index is also considered for T0, a temporal neighboring block, but this is only an example. T0 may be used to generate a constructed candidate, regardless of whether the reference picture index is the same or not. Alternatively, it may be restricted so that TO is not used to generate the constructed candidate.

In addition, in the above embodiment, a constructed candidate is generated based on the neighboring block with the same reference picture index, but this is only an example. Neighboring blocks with the same reference picture may be derived from each group, and a constructed candidate may be generated through a combination of motion vectors for the derived neighboring blocks.

In the process of configuring the candidate list, a redundancy check process may be performed. At least one of an inherited candidate, a constructed candidate, an average candidate, or a zero candidate may be added to the candidate list, and each affine candidate may be selectively added through a redundancy check with affine candidates already included in the candidate list.

In the case of affine mode, various types of affine models, such as 4-parameter and 6-parameter, may be used, and because of this, the number of control point vectors for each affine candidate may be different. Therefore, it is necessary to equalize the number of control point vectors for redundancy check between affine candidates. The redundancy check may be performed between an affine candidate already included in the candidate list (hereinafter referred to as a previous affine candidate) and an affine candidate to be added to the candidate list (hereinafter referred to as a current affine candidate).

For example, when the type of the affine model of the current affine candidate is 4-parameter, it may include only the first control point vector (cpMV[0]) and the second control point vector (cpMV[1]). In this case, by deriving the motion vector at the third control point and assigning it to the third control point vector (cpMV[2]), it is possible to check for redundancy with the previous affine candidate having the type of affine model being the 6-parameter. Alternatively, when the type of the affine model of the current affine candidate is 4-parameter, it may include only the first control point vector (cpMV[0]) and the third control point vector (cpMV[2]). In this case, by deriving the motion vector at the second control point and assigning it to the second control point vector (cpMV[1]), it is possible to check for redundancy with the previous affine candidate having the type of affine model being the 6-parameter.

Alternatively, the redundancy check may be constrained to being performed between affine candidates with the same type of affine model.

For example, when the type of the affine model of the current affine candidate is 4-parameter, a redundancy check may be performed with an affine candidate whose type of affine model is 4-parameter among the affine candidates already included in the candidate list. Alternatively, when the type of the affine model of the current affine candidate is 6-parameter, a redundancy check may be performed with the affine candidate whose type of affine model is 6-parameter among the affine candidates already included in the candidate list.

The redundancy check may be performed based on whether the control point vectors are the same. Here, whether the control point vectors are the same may be checked for each of the first to third control point vectors. Alternatively, whether the control point vectors are the same may be checked for any one of the first to third control point vectors, and the remaining control point vectors may not be checked. Here, any one of the first to third control point vectors may be limited to the first control point vector. Alternatively, whether the control point vectors are the same may be checked for any two of the first to third control point vectors, and the remaining control point vector may not be checked. Here, any two of the first to third control point vectors may be limited to the first control point vector and the second control point vector.

As an example, a redundancy check based on whether control point vectors are the same may be performed as shown in Table 5 below.

TABLE 5

```
If( (Cand[i][0] != CurrCand[0]) || (Cand[i][1] != CurrCand[1]) ||
(Cand[i][2] != CurrCand[2])
  bPruned = false;
else
  bPruned = true;
```

In Table 5, Cand[i][0], Cand[i][1], and Cand[i][2] may refer to the first control point vector, second control point vector, and third control point vector of the previous affine candidate, respectively. CurrCand[0], CurrCand[1], and CurrCand[2] may refer to the first control point vector, second control point vector, and third control point vector of the current affine candidate, respectively.

As shown in Table 5, it may check whether each control point vector is the same between the previous affine candidate and the current affine candidate. When at least one of the first to third control point vectors of the current affine candidate is different from the previous affine candidate ((Cand[i][0]!=CurrCand[0]), (Cand[i][1]!=CurrCand[1]), or (Cand[i][2]!=CurrCand[2])), the current affine candidate may be added to the candidate list. On the other hand, when the first to third control point vectors of the current affine candidate are the same as the first to third control point vectors of the previous affine candidate, the current affine candidate may not be added to the candidate list.

Alternatively, the redundancy check may be performed based on whether the control point vector difference is the same. Here, the control point vector difference may include the difference between the second control point vector and the first control point vector (hereinafter referred to as the first control point vector difference) or the difference between the third control point vector and the first control point vector (hereinafter, referred to as the second control point vector difference). Alternatively, the control point vector difference may further include a third control point vector difference, which is the difference between the third control point vector and the second control point vector.

As an example, a redundancy check based on whether the control point vector difference is the same may be performed as shown in Table 6 below.

TABLE 6

```
diffMV0[i] = Cand[i][1] − Cand[i][0];
diffMV1[i] = Cand[i][2] − Cand[i][0];
diffCurrMV0 = CurrCand[1] − CurrCand[0];
diffCurrMV1 = CurrCand[2] − CurrCand[0];
If( (diffMV0[i] != diffCurrMV0) || (diffMV1[i] != diffCurrMV1) )
  bPruned = false;
else
  bPruned = true;
```

In Table 6, diffMV0[i] may refer to the first control point vector difference of the previous affine candidate, and diffMV1[i] may refer to the second control point vector difference of the previous affine candidate. In addition, diffCurrMV0 may refer to the first control point vector difference of the current affine candidate, and diffCurrMV1 may refer to the second control point vector difference.

As shown in Table 6, it may check whether each control point vector difference between the previous affine candidate and the current affine candidate is the same. When at least one of the first and second control point vector differences of the current affine candidate is different from the previous affine candidate ((diffMV0[i]!=diffCurrMV0) or (diffMV1[i]!=diffCurrMV1)), the current affine candidate may be added to the candidate list. On the other hand, when the first and second control point vector differences of the current affine candidate are the same as the first and second control point vector differences of the previous affine candidate, the current affine candidate may not be added to the candidate list.

Alternatively, the redundancy check may be performed based on whether the control point vector difference is the same and whether the control point vector is the same. As described above, the control point vector difference may include at least one of a first control point vector difference or a second control point vector difference. The control point vector difference may further include a third control point vector difference, which is the difference between a third control point vector and a second control point vector. Additionally, whether the control point vector is the same may be checked for each of the first to third control point vectors. Alternatively, whether the control point vector is the same may be checked for any one of the first to third control point vectors, and the remaining control point vectors may not be checked. Here, any one of the first to third control point vectors may be limited to the first control point vector. Alternatively, whether the control point vectors are the same may be checked for any two of the first to third control point vectors, and the remaining control point vector may not be checked. Here, any two of the first to third control point vectors may be limited to the first control point vector and the second control point vector.

As an example, the redundancy check may be performed as shown in Table 7 below.

TABLE 7

```
diffMV0[i] = Cand[i][1] − Cand[i][0];
diffMV1[i] = Cand[i][2] − Cand[i][0];
diffCurrMV0 = CurrCand[1] − CurrCand[0];
diffCurrMV1 = CurrCand[2] − CurrCand[0];
If( (diffMV0[i] != diffCurrMV0) || (diffMV1[i] != diffCurrMV1) ||
(Cand[i][0] != CurrCand[0]) )
  bPruned = false;
else
  bPruned = true;
```

In Table 7, diffMV0[i] may refer to the first control point vector difference of the previous affine candidate, and diffMV1[i] may refer to the second control point vector difference of the previous affine candidate. Additionally, diffCurrMV0 may refer to the first control point vector difference of the current affine candidate, and diffCurrMV1 may refer to the second control point vector difference. Cand[i][0] may refer to the first control point vector of the previous affine candidate, and CurrCand[0] may refer to the first control point vector of the current affine candidate.

As shown in Table 7, it may check whether each control point vector difference is the same between the previous affine candidate and the current affine candidate and whether the first control point vector is the same between the previous affine candidate and the current affine candidate.

When at least one of the first and second control point vector differences of the current affine candidate is different from the previous affine candidate ((diffMV0[i]!=diffCurrMV0) or (diffMV1[i]!=diffCurrMV1)), the current affine candidate may be added to the candidate list. Alternatively, even if the first and second control point vector differences of the current affine candidate and are the same as the first and second control point vector differences of the previous affine candidate, when the first control point vector of the previous affine candidate is different from the first control point vector of the current affine candidate (Cand[i][0]!=CurrCand[0]), the current affine candidate may be added to the candidate list. On the other hand, when the first and second control point vector differences of the previous affine candidate are the same as the first and second control point vector differences of the current affine candidate and the first control point vector of the previous affine candidate is the same as the first control point vector of the current affine candidate, the current affine candidate may not be added to the candidate list.

Alternatively, the redundancy check may be performed based on at least one of whether the difference of the control point vector differences between the previous affine candidate and the current affine candidate is less than a predetermined threshold or whether the difference of the control point vectors between the previous affine candidate and the current affine candidate is less than a predetermined threshold.

The difference of the control point vector differences may include at least one of the difference between the first control point vector difference of the previous affine candidate and the first control point vector difference of the current affine candidate, and the difference between the second control point vector difference of the previous affine candidate and the second control point vector difference of the current affine candidate, or the difference between the third control point vector difference of the previous affine candidate and the third control point vector difference of the current affine candidate.

The difference of control point vectors between the previous affine candidate and the current affine candidate may include at least one of the difference between the first control point vector of the previous affine candidate and the first control point vector of the current affine candidate, the difference between the second control point vector of the previous affine candidate and the second control point vector of the current affine candidate, or the difference between the third control point vector of the previous affine candidate and the third control point vector of the current affine candidate.

The threshold may be partially the same or different depending on the comparison target. The threshold may be variably determined in consideration of the shape, size of the block, or picture resolution, or may be a pre-defined value identical to the encoding apparatus and the decoding apparatus.

As an example, the redundancy check may be performed as shown in Table 8 below.

TABLE 8

```
diffMV0[i] = Cand[i][1] − Cand[i][0];
diffMV1[i] = Cand[i][2] − Cand[i][0];
diffCurrMV0 = CurrCand[1] − CurrCand[0];
diffCurrMV1 = CurrCand[2] − CurrCand[0];
If( (|diffMV0[i] − diffCurrMV0| < threshold_0) || (|diffMV1[i] −
diffCurrMV1| < threshold_1)) || (|Cand[i][0] − CurrCand[0]| <
threshold_2) )
  bPruned = false;
else
  bPruned = true;
```

In Table 8, diffMV0[i] may refer to the first control point vector difference of the previous affine candidate, and diffMV1[i] may refer to the second control point vector difference of the previous affine candidate. Additionally, diffCurrMV0 may refer to the first control point vector difference of the current affine candidate, and diffCurrMV1 may refer to the second control point vector difference.

Cand[i][0] may refer to the first control point vector of the previous affine candidate, and CurrCand[0] may refer to the first control point vector of the current affine candidate.

As shown in Table 8, when the difference between the first control point vector difference of the previous affine candidate and the first control point vector difference of the current affine candidate (|diffMV0[i]-diffCurrMV0|) is less than threshold_0, the difference between the second control point vector difference of the previous affine candidate and the second control point vector difference of the current affine candidate (|diffMV1[i]-diffCurrMV1|) is less than threshold_1, or the difference between the first control point vector of the previous affine candidate and the second control point vector of the current affine candidate (|Cand [i][0]-CurrCand[0]|) is less than threshold_2, the current affine candidate may be added to the candidate list. On the other hand, otherwise, the current affine candidate may not be added to the candidate list.

The above-described embodiments are briefly described for convenience of explanation, and in the case of bidirectional prediction, the above-described method may be applied to bi-directions, respectively. In this case, when the condition of the above-described embodiment is satisfied for at least one of the bi-directions, the current affine candidate may be added to the candidate list. On the other hand, when the condition of the above-described embodiment is not satisfied for bi-directions, the current affine candidate may not be added to the candidate list.

In configuring the candidate list, it is possible to increase the compression efficiency by generating various affine candidates. In particular, if the various candidates are configured by increasing the number of merge candidates for the merge mode without changing the number of affine candidates for the affine mode, the probability of selecting merge mode rather than affine mode increases. Therefore, it is necessary to increase the number of affine candidates for the affine mode. In addition, by deriving the same number of affine candidates as the merge mode, it is possible to increase the ease and understanding of implementation. For example, when the number of merge candidates for the merge mode is 10, the number of affine candidates for the affine mode may be determined as 10 or (10-1). Alternatively, when the number of merge candidates for the merge mode is 15, the number of affine candidates for the affine mode may be determined as 15 or (15-1).

In addition, the plurality of affine candidates belonging to the candidate list may be rearranged. The rearrangement may be performed based on a template-based cost. The plurality of affine candidates may be grouped into one or more sub-groups. The candidate with the zero motion vector included in the candidate list may be excluded from the grouping.

Affine candidates may be grouped by type. In one example, the candidate list may be divided into at least one of include a first sub-group composed of the inherited candidate, a second sub-group composed of the constructed candidate, a third sub-group composed of the history-based candidate, a fourth sub-group composed of the average candidate, or the fifth sub-group composed of the remaining candidate.

Alternatively, the size of the sub-group is pre-defined equally for the encoding apparatus and the decoding apparatus and may be 2, 3, 4, 5, or more. The size of the sub-group may be determined/defined differently depending on the inter prediction mode of the current block. For example, when the current block is encoded in merge mode, the size of the sub-group may be 5, and when the current block is encoded in affine mode, the size of the sub-group may be 3.

The rearrangement may be performed for each sub-group of the candidate list. In this case, it may be performed on all sub-groups of the candidate list or only on some sub-groups. For example, the rearrangement may not be performed on the sub-group including the candidate with the zero motion vector. Alternatively, the rearrangement may not be performed on the sub-group to which the candidate with the smallest index (i.e., 0) among the indexes of the candidate list belongs, but the rearrangement may be performed on the sub-group to which the candidate with the largest index belongs. Conversely, the rearrangement may be performed on the sub-group to which the candidate with the smallest index among the indexes of the candidate list belongs, and may not be performed on the sub-group to which the candidate with the largest index belongs. Alternatively, the rearrangement may not be performed on the sub-groups to which the candidate with the smallest index and the candidate with the largest index among the indexes of the candidate list belong respectively, but the rearrangement may be performed on the remaining sub-groups. Alternatively, rearrangement may not be performed on the sub-group to which the candidate with the largest index among the indexes of the candidate list belongs, and the rearrangement may be performed on the remaining sub-groups.

The template-based cost for the rearrangement may be calculated as the sum of absolute difference (SAD) between samples belonging to the template region of the current block and samples belonging to the reference template region. The SAD may be calculated for each of a plurality of affine candidates belonging to a sub-group. The plurality of affine candidates belonging to a sub-group may be rearranged in ascending order of the calculated SADs.

The template region of the current block may be a neighboring region adjacent to the current block. Here, the neighboring region may include at least one of a top neighboring region, a left neighboring region, or an top-left neighboring region of the current block. Assuming that the width and height of the current block are W and H, the top neighboring region may have a size of W×N, the left neighboring region may have a size of N×H, and the top-left neighboring region may have a size of N×N. N may be an integer of 1, 2, 3 or more. N may be the pre-defined value equally for the encoding apparatus and the decoding apparatus, or may be variably determined based on at least one of the size, shape, or inter prediction mode of the current block.

The range of the neighboring region may be determined differently depending on the inter prediction mode of the current block. For example, depending on the inter prediction mode of the current block, the neighboring region may be configured with a top neighboring region and a left neighboring region, or the neighboring region may be configured with one of a top neighboring region or a left neighboring region.

The reference template region may be determined based on motion information of an affine candidate included in the candidate list. For example, motion vecto in units of sub-blocks for the current block may be derived based on the control point vector of the affine candidate. The reference sub-block may be determined based on the motion vector of each sub-block belonging to the top row and left column within the current block. The reference template region may be configured based on the sub-template region of each reference sub-block.

In this case, the sub-template region of the reference sub-block corresponding to the sub-block belonging to the top row within the current block may be configured with the top neighboring region of the reference sub-block. Assuming that the width and height of the reference sub-block are subW and subH, the top neighboring region of the reference sub-block may have a size of subW×N. On the other hand, the sub-template region of the reference sub-block corresponding to the sub-block belonging to the left column within the current block may be configured with the left neighboring region of the reference sub-block. Likewise, the left neighboring region of the reference sub-block may have a size of N×subH. However, since the top-left sub-block in the current block belongs to the top row and the left column, the sub-template region of the reference sub-block corresponding to the top-left sub-block may be configured with the top and left neighboring regions of the reference sub-block. Here, the top neighboring region of the reference sub-block may have a size of subW×N, and the left neighboring region may have a size of N×subH.

The embodiment of the reference template region assumes that the template region of the current block is configured with a top neighboring region and a left neighboring region. Accordingly, the range of the reference template region may be determined to correspond to the range of the template region of the current block.

For example, when the template region of the current block is configured with the top neighboring region, each reference sub-block may be determined using only the motion vector of each sub-block belonging to the top row in the current block, and the reference template region may be configured based on the sub-template region of each reference sub-block. Alternatively, when the template region of the current block is configured with the left neighboring region, each reference sub-block may be determined using only the motion vector of each sub-block belonging to the left column in the current block, and the reference template region may be configured based on the sub-template region of each reference sub-block.

When performing rearrangement based on the template-based cost, the following factors may be additionally considered.

The rearrangement may be performed for each type of affine candidate. For example, the rearrangement may be performed for inherited candidates and configured candidates respectively. Alternatively, the rearrangement may be performed for average candidates.

A plurality of affine candidates in the candidate list may be divided into sub-groups, and the rearrangement may be performed for each sub-group. For example, when the size of the sub-group for rearrangement is 5, rearrangement may be performed on the five affine candidates belonging to each sub-group.

The rearrangement may be performed for all affine candidates included in the candidate list, without considering the type of affine candidate and/or the size of the sub-group.

A candidate index may be signaled based on all candidates belonging to the rearranged candidate list. Here, the candidate index may be information that specifies one of all candidates in the rearranged candidate list.

Alternatively, the candidate index may be signaled based on a predetermined number of candidates separately from the total number of candidates in the rearranged candidate list. Here, the candidate index may be information that specifies one of some candidates rather than all candidates included in the rearranged candidate list. For example, some candidates may mean affine candidates belonging to one or more rearranged sub-groups. The some candidates may mean affine candidates belonging to the first sub-group among a plurality of sub-groups in the candidate list. Here, the first sub-group may refer to the sub-group to which the affine candidate with the smallest index among the indices of the candidate list belongs. Alternatively, the predetermined number may be the pre-defined number equally for the encoding apparatus and the decoding apparatus, and may be smaller than the total number of candidates included in the candidate list. When the predetermined number is two, the some candidates may represent the top two candidates of the candidate list. In this case, the candidate index may be information that specifies one of the top two candidates. However, the predetermined number is not limited to 2, and may be defined as 3, 4, 5 or more.

Referring to FIG. 4, the control point vector of the current block may be derived based on the candidate list and the candidate index (S410).

The candidate index may refer to an index encoded to derive the control point vector of the current block. The candidate index may specify one of a plurality of candidates belonging to the candidate list. When an affine candidate is specified by the candidate index, the control point vector of the current block may be derived using the control point vector of the affine candidate.

For example, it is assumed that the type of the affine model of the current block is 4-parameter (i.e., the current block is determined to use two control point vectors). In this case, when the affine candidate specified by the candidate index has three control point vectors, two of the three control point vectors (e.g., a control point vector with Idx=0, 1, or a control point vector with Idx=0, 2) may be selected and set as the control point vectors of the current block. Alternatively, the three control point vectors of the specified affine candidate may be set as the control point vectors of the current block. In this case, the type of the affine model of the current block may be updated to 6-parameter.

Conversely, it is assumed that the type of the affine model of the current block is 6-parameter (i.e., the current block is determined to use three control point vectors). In this case, when the affine candidate specified by the candidate index has two control point vectors, one additional control point vector may be generated, and the two control point vectors of the affine candidate and the additional control point vector may be set as the control point vectors of the current block. The additional control point vector may be derived based on at least one of the two control point vectors of the affine candidate, the position of the block corner corresponding to the two control point vectors, or the size/position information of the current/neighboring block. Alternatively, the two control point vectors of the specified affine candidate may be set as the control point vectors of the current block. In this case, the type of the affine model of the current block may be updated to 4-parameter.

Based on the control point vector, the motion vector of the current block may be derived (S420).

The motion vector may be derived in units of subblocks of the current block. For this, the current block may be divided into a plurality of N×M subblocks. Here, the N×M subblock may be non-square (N>M or N<M) or square (N=M). The N and M values may be 2, 4, 8, 16, 32 or more. It will be described in detail for the method of deriving a motion vector in units of subblocks with reference to FIG. 7.

Referring to FIG. 4, inter prediction may be performed on the current block using the derived motion vector (S430).

Specifically, the reference block may be specified using the motion vector of the current block. The reference block may be individually specified for each subblock of the current block. The reference block of each sub-block may belong to one reference picture. That is, subblocks belonging to the current block may share one reference picture. Alternatively, the reference picture index may be independently set for each subblock of the current block. The specified reference block may be set as a prediction block of the current block.

Steps S400 to S430 described with reference to FIG. 4 may be performed in the same/similar manner in the affine inter mode, and redundant description will be omitted here.

However, the control point vector predicted value of the current block may be derived based on the candidate list and the candidate index described above, and the control point vector of the current block may be derived based on the control point vector difference signaled from the bitstream and the control point vector predicted value. This method of deriving the control point vector can be seen as a distinguishing feature from the affine merge mode.

Here, in the case of a candidate list for the affine inter mode, the maximum number of affine candidates that can be included in the candidate list may be limited to two. The candidate index for the affine inter mode may have a value of 0 or 1, and may specify one of the two affine candidates in the candidate list.

Alternatively, it may be considered to increase the number of affine candidates for the affine inter mode. As described above, the candidate list for an affine inter mode may include a plurality of affine candidates, and the plurality of affine candidates may include at least one of an inherited candidate, a constructed candidate, a history-based candidate, or an average candidate. Additionally, the candidate list may further include one or more translational candidates. The translational candidate, unlike the affine candidate, may mean a candidate with one motion vector. The translational candidate may be derived from the spatial or temporal neighboring block of the current block, and may further include a candidate with a zero motion vector.

As the number of candidates for the affine inter mode increases, a candidate index may be signaled based on all or some candidates in the candidate list. In this case, the number of all or some candidates may be 2, 3, 4, 5, or more. The method of determining some candidates is the same as described above.

The average candidate of the candidate list for the above-described affine mode may be applied to the merge mode. In the case of merge mode, one of a plurality of merge candidates in the candidate list may be specified based on the candidate index, motion information of the current block may be derived based on the specified merge candidate, and inter prediction may be performed based on the derived motion information.

The plurality of merge candidates may include at least one of a spatial candidate, a temporal candidate, a non-adjacent candidate, a history-based candidate, an average candidate, or a zero candidate.

The average candidate may be generated based on two target candidates in the candidate list, and the method of selecting the two target candidates is as described with reference to Table 1. Additionally, the two target candidates may be selected from the candidate list considering the type of candidate. For example, at least one of the non-adjacent candidate or the history-based candidate may be excluded from the target candidates for generating the average candidate. However, it is not limited to this, and of course, the target candidate selection method in the above-described affine mode may be applied equally/similarly to the merge mode.

The motion vector of the average candidate may be calculated as the average value between the motion vector of the first target candidate (Cand0) and the motion vector of the second target candidate (Cand1). At least one of the reference picture index, inter prediction direction information, weight information for bidirectional weighted prediction, or a flag indicating whether local illuminance compensation is applied of the average candidate may be inherited from any one of the two target candidates.

Additionally, the average candidate may be adaptively added/stored to the candidate list by considering pre-defined specific condition. Here, the specific condition may include at least one of whether the target candidate is available (condition 1), whether the two target candidates have the same reference picture index (condition 2), or whether the two target candidates have the same reference picture (condition 3).

Regarding (Condition 1), when two target candidates are available for the L0 prediction direction, an average candidate may be generated based on the two target candidates. In this case, the motion vector in the L0 prediction direction for the average candidate may be calculated as the average value between the motion vector in the L0 prediction direction for the first target candidate and the motion vector in the L0 prediction direction for the second target candidate.

When only one of two target candidates is available for the L0 prediction direction, an average candidate may not be generated based on the two target candidates. That is, the motion vector in the L0 prediction direction for the average candidate may not be calculated as the average value between the motion vector in the L0 prediction direction for the first target candidate and the motion vector in the L0 prediction direction for the second target candidate. Instead, the motion vector in the L0 prediction direction for the average candidate may be set/stored as the motion vector in the L0 prediction direction of the target candidate available for the L0 prediction direction.

Through the same method, the motion vector in the L1 prediction direction for the average candidate may be derived, and detailed description will be omitted.

Regarding (Condition 2), when the reference picture indices in the L0 prediction direction for two target candidates are the same, an average candidate may be generated based on the two target candidates. In this case, the motion vector in the L0 prediction direction for the average candidate may be calculated as the average value between the motion vector in the L0 prediction direction for the first target candidate and the motion vector in the L0 prediction direction for the second target candidate.

When the reference picture indices in the L0 prediction direction for two target candidates are different from each other, an average candidate may not be generated based on the two target candidates. That is, the motion vector in the L0 prediction direction for the average candidate may not be calculated as the average value between the motion vector in the L0 prediction direction for the first target candidate and the motion vector in the L0 prediction direction for the second target candidate. Instead, the motion vector in the L0 prediction direction for the average candidate may be set/stored as a motion vector in the L0 prediction direction for any one of the two target candidates. Here, one of the two target candidates may refer to a candidate (i.e., Cand0) whose index of the candidate list is smaller among the two target candidates. Alternatively, one of the two target candidates may refer to a candidate whose reference picture index is smaller among the two target candidates.

Through the same method, the motion vector in the L1 prediction direction for the average candidate may be derived, and detailed description will be omitted.

Regarding (condition 3), when the difference between the output order information (POCref0[Cand0]) of the reference picture in the L0 prediction direction for the first target candidate and the output order information (POCref0 [Cand1]) of the reference picture in the L0 prediction direction for the second target candidate is 0, an average candidate may be generated based on the two target candidates. In this case, the motion vector in the L0 prediction direction for the average candidate may be calculated as the average value between the motion vector in the L0 prediction direction for the first target candidate and the motion vector in the L0 prediction direction for the second target candidate.

When the difference between POCref0[Cand0] and POCref0[Cand1] is not 0, an average candidate may not be generated based on the two target candidates. That is, the motion vector in the L0 prediction direction for the average candidate may not be calculated as the average value between the motion vector in the L0 prediction direction for the first target candidate and the motion vector in the L0 prediction direction for the second target candidate. Instead, the motion vector in the L0 prediction direction for the average candidate may be set/stored as a motion vector in the L0 prediction direction for any one of the two target candidates. Here, one of the two target candidates may refer to a candidate (i.e., Cand0) whose index of the candidate list is smaller among the two target candidates. Alternatively, one of the two target candidates may refer to a candidate whose reference picture index is smaller among the two target candidates. Alternatively, one of the two target candidates may refer to a candidate with a smaller difference from the output order information of the current picture to which the current block belongs among the two target candidates.

Through the same method, the motion vector in the L1 prediction direction for the average candidate may be derived, and detailed description will be omitted.

The average candidate may be limited to be added to the candidate list only when the average candidate is generated based on the two target candidates for all the L0 and L1 prediction directions. Alternatively, when the above-mentioned condition is satisfied for any one of the L0 and L1 prediction directions and an average candidate is generated based on the two target candidates, the average candidate may be added to the candidate list. That is, when each of the motion vectors in the L0 and L1 prediction directions for the average candidate is set/stored as the motion vector of one of the two target candidates, the average candidate may not be added to the candidate list.

When configuring a candidate list for merge mode, the average candidate may be adaptively added based on a redundancy check with merge candidates already included in the candidate list.

As an example, the redundancy check may be performed based on whether the motion vector of the average candidate and the motion vector of the pre-included merge candidate are the same.

Alternatively, the redundancy check may be performed based on whether the difference between the motion vector of the average candidate and the motion vector of the pre-included merge candidate is smaller than a predetermined threshold. When the difference between the motion vector of the average candidate and the motion vector of the pre-included merge candidate is smaller than a predetermined threshold, the average candidate may not be added to the candidate list, otherwise, the average candidate may be added to the candidate list.

Additionally, embodiments of the method for configuring a candidate list for affine mode may be applied in the same/similar manner to configuring a candidate list for merge mode, and detailed descriptions will be omitted.

Figure 5:
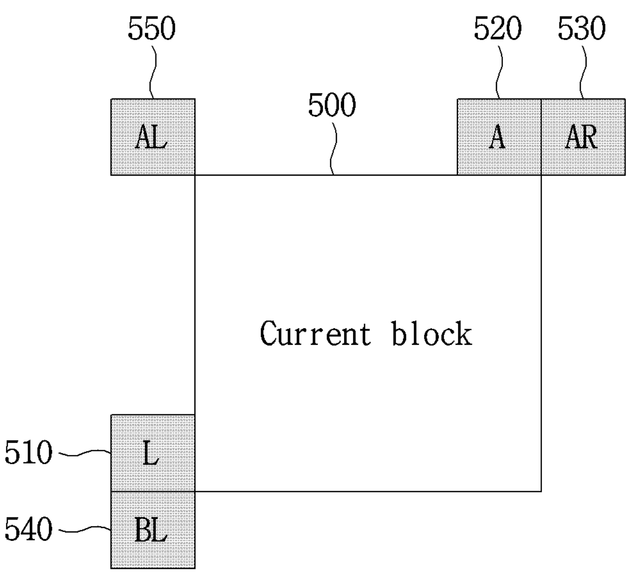
FIG. 5 relates to a method of deriving an affine candidate from a control point vector of a spatial/temporal neighboring block according to an embodiment of the present disclosure.

FIG. 5 is an embodiment according to the present disclosure and relates to a method of deriving an affine candidate from a control point vector of a spatial/temporal neighboring block.

The width and height of the current block 500 are chW and cbH, respectively, and the position of the current block is (xCb, yCb). The width and height of the spatial neighboring blocks 510 to 550 are nbW and nbH, respectively, and the positions of the spatial neighboring blocks are (xNb, yNb). The spatial neighboring block may include at least one of the left block 510, the bottom-left block 540, the top-right block 430, the top block 420, or the top-left block 450 of the current block. Alternatively, the spatial neighboring block may further include at least one of a block adjacent to the right of the top-left block 450 or a block adjacent to the bottom of the top-left block 450.

A spatial candidate may have N control point vectors (cpMV). Here, N may be an integer of 1, 2, 3, or more. The N value may be determined based on at least one of information on whether the block is decoded in units of subblocks, information on whether the block is coded in the affine mode, or information on the type of affine model (4-parameter or 6-parameter).

For example, when the block is decoded in units of subblocks or is a block coded in the affine mode according to the above information, the block may have two control point vectors. On the other hand, otherwise, the block may not perform the affine model-based prediction.

Alternatively, when the block is a block coded in the affine mode and the type of the affine model is 6-parameter according to the above information, the block may have three control point vectors. On the other hand, otherwise, the block may not perform the affine model-based prediction.

The above-described information may be encoded in the encoding apparatus and may be signaled. Alternatively, all or part of the information may be derived in the decoding apparatus based on the properties of the block. Here, the block may mean the current block or a spatial/temporal neighboring block of the current block. The properties may mean size, shape, position, division type, inter mode, parameters related to residual coefficients, etc. The inter mode may be a pre-defined mode in the decoding apparatus and may refer to merge mode, skip mode, AMVP mode, affine mode, intra/inter combination mode, current picture reference mode, etc. Alternatively, the N value may be derived in the decoding apparatus based on the properties of the block.

In this embodiment, n control point vectors may be expressed as a first control point vector (cpMV[0]), a second control point vector (cpMV[1]), a third control point vector (cpMV[2]), . . . a n-th control point vector (cpMV[n−1]).

As an example, a first control point vector (cpMV[0]), a second control point vector (cpMV[1]), a third control point vector (cpMV[2]) and a fourth control point vector (cpMV [3]) may be a vector corresponding to a position of a top-left corner, a top-right corner, a bottom-left corner and a bottom-right corner of a block, respectively. Here, it is assumed that a spatial candidate has three control point vectors, and three control point vectors may be an arbitrary control point vector selected from a first to n-th control point vector. However, it is not limited thereto, and a spatial candidate may have two control point vectors, and two control point vectors may be an arbitrary control point vector selected from a first to n-th control point vector.

Hereinafter, a method of deriving a control point vector of a spatial candidate is described.

1. When a Boundary of a Current Block does not Border a CTU Boundary

The first control point vector may be derived based on at least one of a first control point vector of a spatial neighboring block, a predetermined difference value, position information of a current block (xCb, yCb) or position information of a spatial neighboring block (xNb, yNb).

The number of difference values may be 1, 2, 3, or more. The number of difference values may be variably determined based on the above-described properties of the block, or may be a pre-defined value in the encoding/decoding apparatus. The difference value may be defined as a difference value between one of a plurality of control point vectors and another one.

For example, the difference value may include at least one of a first difference value between a second control point vector and a first control point vector, a second difference value between a third control point vector and a first control point vector, a third difference value between a fourth control point vector and a third control point vector or a fourth difference value between a fourth control point vector and a second control point vector.

Specifically, a first control point vector may be derived as in Equation 1 below.

$$cpMvLX[0][0] = (mvScaleHor + dHorX*(xCb - xNb) + dHorY*(yCb - yNb))$$

$$cpMvLX[0][1] = (mvScaleVer + dVerX*(xCb - xNb) + dVerY*(yCb - yNb)) \quad \text{[Equation 1]}$$

In Equation 1, variable mvScaleHor and mvScale Ver may refer to a first control point vector of a spatial neighboring block, or may refer to a value derived by applying a shift operation by k to a first control point vector. Here, k may be an integer of 1, 2, 3, 4, 5, 6, 7, 8, 9 or more. Variable dHorX and dVerX correspond to a x component and a y component of a first difference value between a second control point vector and a first control point vector, respectively. Variable dHorY and dVerY correspond to a x component and a y component of a second difference value between a third control point vector and a first control point vector, respectively. The above-described variable may be derived as in Equation 2 below.

$$mvScaleHor = CpMvLX[xNb][yNb][0][0] \ll 7 \quad \text{[Equation 2]}$$

$$mvScaleVer = CpMvLX[xNb][yNb][0][1] \ll 7$$

$$dHorX = (CpMvLX[xNb + nNbW - 1][yNb][1][0] - CpMvLX[xNb][yNb][0][0]) \ll (7 - \log2NbW)$$

$$dVerX = (CpMvLX[xNb + nNbW - 1][yNb][1][1] - CpMvLX[xNb][yNb][0][1]) \ll (7 - \log2NbW)$$

-continued $$dHorY = (CpMvLX[xNb][yNb + nNbH - 1][2][0] - CpMvLX[xNb][yNb][2][0]) \ll (7 - \log2NbH)$$

$$dVerY = (CpMvLX[xNb][yNb + nNbH - 1][2][1] - CpMvLX[xNb][yNb][2][1]) \ll (7 - \log2NbH$$

A second control point vector may be derived based on at least one of a first control point vector of a spatial neighboring block, a predetermined difference value, position information (xCb, yCb) of a current block, a block size (a width or a height) or position information (xNb, yNb) of a spatial neighboring block. Here, a block size may refer to a size of a current block and/or a spatial neighboring block. The difference value is the same as described in a first control point vector, so a detailed description is omitted here. However, a range and/or the number of difference values used in a process of deriving a second control point vector may be different from those of a first control point vector.

Specifically, a second control point vector may be derived as in Equation 3 below.

$$cpMvLX[1][0] = (mvScaleHor + dHorX*(xCb + cbWidth - xNb) + dHorY*(yCb - yNb)) \quad \text{[Equation 3]}$$

$$cpMvLX[1][1] = (mvScaleVer + dVerX*(xCb + cbWidth - xNb) + dVerY*(yCb - yNb))$$

In Equation 3, variable mvScaleHor, mvScaleVer, dHorX, dVerX, dHorY, and dVerY are the same as described in Equation 1, and a detailed description is omitted here.

A third control point vector may be derived based on at least one of a first control point vector of a spatial neighboring block, a predetermined difference value, position information (xCb, yCb) of a current block, a block size (a width or a height) or position information (xNb, yNb) of a spatial neighboring block. Here, a block size may refer to a size of a current block and/or a spatial neighboring block. The difference value is the same as described in a first control point vector, so a detailed description is omitted here. However, a range and/or the number of difference values used in a process of deriving a third control point vector may be different from those of a first control point vector or a second control point vector.

Specifically, a third control point vector may be derived as in Equation 4 below.

$$cpMvLX[2][0] = (mvScaleHor + dHorX*(xCb - xNb) + dHorY*(yCb + cbHeight - yNb)) \quad \text{[Equation 4]}$$

$$cpMvLX[2][1] = (mvScaleVer + dVerX*(xCb - xNb) + dVerY*(yCb + cbHeight - yNb))$$

In Equation 4, variable mvScaleHor, mvScaleVer, dHorX, dVerX, dHorY, and dVerY are the same as described in Equation 1, and a detailed description is omitted here. Meanwhile, through the above-described process, a n-th control point vector of a spatial candidate may be derived.

2. When a Boundary of a Current Block Borders a CTU Boundary

The first control point vector may be derived based on at least one of a motion vector (MV) of a spatial neighboring block, a predetermined difference value, position information of a current block (xCb, yCb) or position information (xNb, yNb) of a spatial neighboring block.

The motion vector may be a motion vector of a sub-block positioned at the lowermost of a spatial neighboring block. The sub-block may be positioned at the leftmost, center or rightmost side among a plurality of sub-blocks positioned at the lowermost of a spatial neighboring block. Alternatively, the motion vector may refer to an average value, a maximum value or a minimum value of a motion vector of a sub-block.

The number of difference values may be 1, 2, 3, or more. The number of difference values may be variably determined based on the above-described properties of the block, or may be a pre-defined value in the encoding/decoding apparatus. The difference value may be defined as a difference value between one of a plurality of motion vectors stored in units of subblocks in the spatial neighboring block and another one. For example, the difference value may mean a difference value between the motion vector of the bottom-right subblock of the spatial neighboring block and the motion vector of the bottom-left sub-block of the spatial neighboring block.

For example, a first control point vector may be derived as in Equation 5 below.

$$cpMvLX[0][0] = (mvScaleHor + dHorX*(xCb - xNb) + dHorY*(yCb - yNb))$$
$$cpMvLX[0][1] = (mvScaleVer + dVerX*(xCb - xNb) + dVerY*(yCb - yNb))$$
[Equation 5]

In Equation 5, variable mvScaleHor and mvScale Ver may refer to a value derived by applying a shift operation by k to the motion vector (MV) or a motion vector (MV) of the above-described spatial neighboring block. Here, k may be an integer of 1, 2, 3, 4, 5, 6, 7, 8, 9 or more.

The variable dHorX and dVerX correspond to a x component and a y component of a predetermined difference value, respectively. Here, a difference value refers to a difference value between a motion vector of a bottom-right sub-block and a motion vector of a bottom-left sub-block within a spatial neighboring block. Variable dHorY and dVerY may be derived based on the variable dHorX and dVerX. The above-described variable may be derived as in Equation 6 below.

$$mvScaleHor = MvLX[xNb][yNb + nNbH - 1][0] \ll 7$$
$$mvScaleVer = MvLX[xNb][yNb + nNbH - 1][1] \ll 7$$
$$dHorX = (MvLX[xNb + nNbW - 1][yNb + nNbH - 1][0] - MvLX[xNb][yNb + nNbH - 1][0]) \ll (7 - \log2NbW)$$
$$dVerX = (MvLX[xNb + nNbW - 1][yNb + nNbH - 1][1] - MvLX[xNb][yNb + nNbH - 1][1]) \ll (7 - \log2NbW)$$
$$dHorY = -dVerX$$
$$dVerY = dHorX$$
[Equation 2]

A second control point vector may be derived based on at least one of a motion vector (MV) of a spatial neighboring block, a predetermined difference value, position information of a current block (xCb, yCb), a block size (a width or a height) or position information (xNb, yNb) of a spatial neighboring block. Here, a block size may refer to a size of a current block and/or a spatial neighboring block. For the motion vector and difference value, as described in a first control point vector, a detailed description is omitted here. However, a position, a scope and/or the number of difference values of a motion vector used in a process of deriving a second control point vector may be different from those of a first control point vector.

For example, a second control point vector may be derived as in Equation 7 below.

$$cpMvLX[1][0] = (mvScaleHor + dHorX*(xCb + cbWidth - xNb) + dHorY*(yCb - yNb))$$
$$cpMvLX[1][1] = (mvScaleVer + dVerX*(xCb + cbWidth - xNb) + dVerY*(yCb - yNb))$$
[Equation 7]

In Equation 7, variable mvScaleHor, mvScaleVer, dHorX, dVerX, dHorY, and dVerY are the same as described in Equation 5, and a detailed description is omitted here.

A third control point vector may be derived based on at least one of a motion vector (MV) of a spatial neighboring block, a predetermined difference value, position information of a current block (xCb, yCb), a block size (a width or a height) or position information (xNb, yNb) of a spatial neighboring block. Here, a block size may refer to a size of a current block and/or a spatial neighboring block. For the motion vector and difference value, as described in a first control point vector, a detailed description is omitted here. However, a position, a scope and/or the number of difference values of a motion vector used in a process of deriving a third control point vector may be different from those of a first control point vector or a second control point vector.

For example, a third control point vector may be derived as in Equation 8 below.

$$cpMvLX[2][0] = (mvScaleHor + dHorX*(xCb - xNb) + dHorY*(yCb + cbHeight - yNb))$$
$$cpMvLX[2][1] = (mvScaleVer + dVerX*(xCb - xNb) + dVerY*(yCb + cbHeight - yNb))$$
[Equation 8]

In Equation 8, the variables mvScaleHor, mvScale Ver, dHorX, dVerX, dHorY, and dVerY are the same as described in Equation 5, and detailed description will be omitted here. Meanwhile, through the above-described process, the first to Nth control point vectors of the spatial candidate may be derived.

The above-described process of deriving an affine candidate may be performed for each pre-defined spatial neighboring block. A pre-defined spatial neighboring block may include at least one of a left block, a bottom-left block, a top-right block, a top block or a top-left block of a current block.

Alternatively, the process of deriving an affine candidate may be performed respectively per group of the spatial neighboring block. Here, a spatial neighboring block may be classified into a first group including a left block and a bottom-left block and a second group including a top-right block, a top block and a top-left block.

For example, one affine candidate may be derived from a spatial neighboring block belonging to a first group. The derivation may be performed based on a predetermined priority until an available affine candidate is found. The priority may be the order of a left block→a bottom-left block or the reverse order. Whether a corresponding spatial neighboring block in a first group is a block decoded through affine model-based prediction may be determined according to the priority, and a block first decoded through affine model-based prediction may be selected as an affine candidate.

Likewise, one affine candidate may be derived from a spatial neighboring block belonging to a second group. The derivation may be performed based on a predetermined priority until an available affine candidate is found. The priority may be the order of a top-right block→a top block→a top-left block or the reverse order. Whether a corresponding spatial neighboring block in a second group is a block decoded through affine model-based prediction may be determined according to the priority, and a block first decoded through affine model-based prediction may be selected as an affine candidate.

The above-described embodiment may be applied equally/similarly to a temporal neighboring block. Here, a temporal neighboring block belongs to a different picture from a current block, but may be a block at the same position as a current block. A block at the same position may be a block including a position of a top-left sample of a current block, a center position or a position of a sample adjacent to a bottom-right sample of a current block.

Alternatively, a temporal neighboring block may refer to a block at a position shifted by a predetermined disparity vector from the block at the same position. Here, a disparity vector may be determined based on a motion vector of any one of spatial neighboring blocks of a current block described above.

Figure 6:
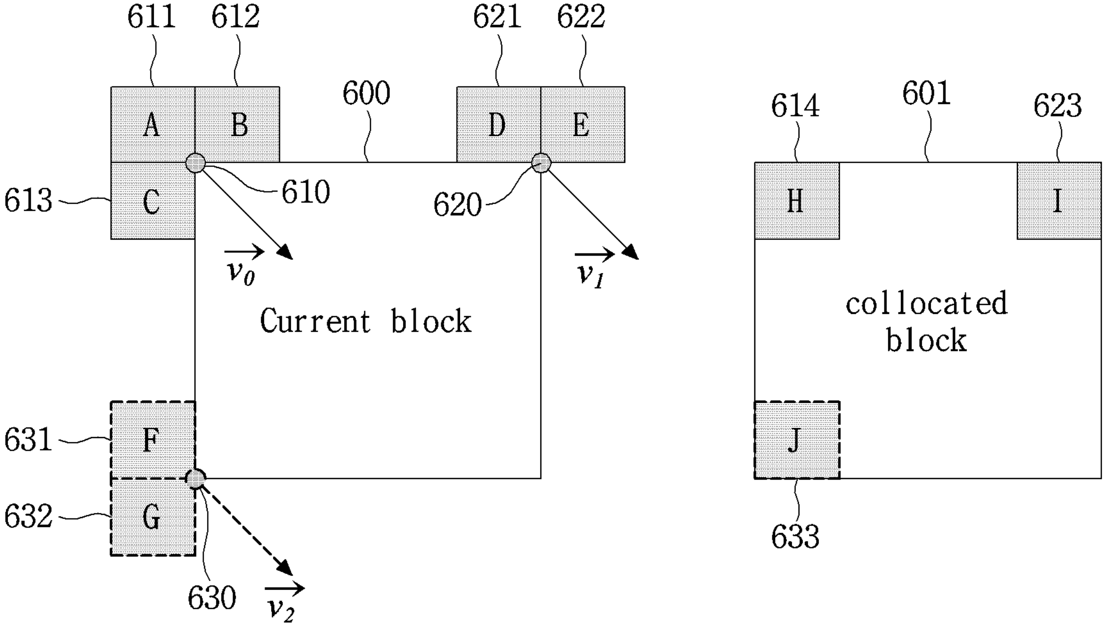
FIG. 6 shows a method of deriving a constructed candidate based on a combination of motion vectors of a spatial/temporal neighboring block according to an embodiment of the present disclosure.

FIG. 6 shows a method of deriving a constructed candidate based on a combination of motion vectors of a spatial/temporal neighboring block according to an embodiment of the present disclosure.

The constructed candidate of the present disclosure may be derived based on a combination of at least two of the control point vectors (hereinafter referred to as control point vector (cpMVCorner[n])) corresponding to each corner position of the current block. Here, n may be 0, 1, 2, or 3.

The control point vector (cpMVCorner [n]) may be derived based on a motion vector of a spatial neighboring block and/or a temporal neighboring block. Here, a spatial neighboring block may include at least one of a first neighboring block (A, B or C) adjacent to a top-left sample of a current block, a second neighboring block (D or E) adjacent to a top-right sample of a current block or a third neighboring block (F or G) adjacent to a bottom-left sample of a current block. As a temporal neighboring block is a block belonging to a different picture from a current block, it may refer to a block at the same position as a current block (hereinafter, referred to as a fourth neighboring block (Col)). Here, a fourth neighboring block may refer to a block (H, I or J) including a position of a top-left sample, a top-right sample or a bottom-left sample of a current block or a block adjacent to a position of a bottom-right sample of a current block.

A first neighboring block may refer to a neighboring block at the top-left (A), the top (B) or the left (C) of a current block. Whether a motion vector of neighboring block A, B and C is available may be determined according to a predetermined priority, and a control point vector may be determined by using a motion vector of an available neighboring block. The availability determination may be performed until a neighboring block with an available motion vector is found. Here, a priority may be in the order of A→B→C. However, it is not limited thereto, and may be in the order of A→C→B, C→A→B, B→A→C.

A second neighboring block may refer to a neighboring block on the top (D) or the top-right (E) of a current block. Likewise, whether a motion vector of neighboring block D and E is available may be determined according to a predetermined priority, and a control point vector may be determined by using a motion vector of an available neighboring block. The availability determination may be performed until a neighboring block with an available motion vector is found. Here, a priority may be in the order of D→E or E→D.

A third neighboring block may refer to a neighboring block on the left (F) or the bottom-left (G) of a current block. Likewise, whether a motion vector of a neighboring block is available may be determined according to a predetermined priority, and a control point vector may be determined by using a motion vector of an available neighboring block. The availability determination may be performed until a neighboring block with an available motion vector is found. Here, a priority may be in the order of G→F or F→G.

For example, a first control point vector (cpMVCorner [0]) may be configured as a motion vector of a first neighboring block, a second control point vector (cpMVCorner [1]) may be configured as a motion vector of a second neighboring block and a third control point vector (cpMVCorner [2]) may be configured as a motion vector of a third neighboring block. A fourth control point vector (cpMVCorner [3]) may be configured as a motion vector of a fourth neighboring block.

Alternatively, a first control point vector may be derived by using a motion vector of at least one of a first neighboring block or a fourth neighboring block, and herein, a fourth neighboring block may be a block (H) including a position of a top-left sample. A second control point vector may be derived by using a motion vector of at least one of a second neighboring block or a fourth neighboring block. Here, a fourth neighboring block may be a block (I) including a position of a top-right sample. A third control point vector may be derived by using a motion vector of at least one of a third neighboring block or a fourth neighboring block. Here, a fourth neighboring block may be a block (J) including a position of a bottom-left sample.

Alternatively, any one of the first to fourth control point vector may be derived based on the other. For example, a second control point vector may be derived by applying a predetermined offset vector to a first control point vector. An offset vector may be a difference vector between a third control point vector and a first control point vector or may be derived by applying a predetermined scaling factor to the difference vector. A scaling factor may be determined based on at least one of a width or a height of a current block and/or a neighboring block.

K constructed candidates (ConstK) according to the present disclosure may be determined through a combination of at least two of the above-described first to fourth control point vectors. The K value may be an integer of 1, 2, 3, 4, 5, 6, 7 or more. The K value may be derived based on information signaled from the encoding apparatus, or may be a pre-defined value in the encoding/decoding apparatus.

The information may include information indicating the maximum number of constructed candidates to be included in the candidate list.

Specifically, a first constructed candidate (Const1) may be derived by combining a first to third control point vector. For example, a first constructed candidate (Const1) may have a control point vector as in Table 9 below. Meanwhile, only when reference picture information of a first neighboring block is the same as reference picture information of a second and third neighboring block, there may be a limit that a control point vector is constructed as in Table 9. Here, reference picture information may refer to a reference picture index showing a position of a corresponding reference picture in a reference picture list or may refer to a picture order count (POC) value showing output order.

TABLE 9

| Idx | Control point vector |
|---|---|
| 0 | cpMvCorner[0] |
| 1 | cpMvCorner[1] |
| 2 | cpMvCorner[2] |

A second constructed candidate (Const2) may be derived by combining a first, second and fourth control point vector. For example, a second constructed candidate (Const2) may have a control point vector as in Table 10 below. Meanwhile, only when reference picture information of a first neighboring block is the same as reference picture information of a second and fourth neighboring block, there may be a limit that a control point vector is constructed as in Table 10. Here, reference picture information is as described above.

TABLE 10

| Idx | Control point vector |
|---|---|
| 0 | cpMvCorner[0] |
| 1 | cpMvCorner[1] |
| 2 | cpMvCorner[3] + cpMvCorner[1] − cpMvCorner[0] |
| | cpMvCorner[3] + cpMvCorner[0] − cpMvCorner[1] |

A third constructed candidate (Const3) may be derived by combining a first, third and fourth control point vector. For example, a third constructed candidate (Const3) may have a control point vector as in Table 11 below. Meanwhile, only when reference picture information of a first neighboring block is the same as reference picture information of a third and fourth neighboring block, there may be a limit that a control point vector is constructed as in Table 11. Here, reference picture information is as described above.

TABLE 11

| Idx | Control point vector | Control point vector |
|---|---|---|
| 0 | cpMvCorner[0] | cpMvCorner[0] |
| 1 | cpMvCorner[3] + cpMvCorner[0] − cpMvCorner[2] | cpMvCorner[2] |
| 2 | cpMvCorner[2] | cpMvCorner[0] + cpMvCorner[3] − cpMvCorner[2] |

A fourth constructed candidate (Const4) may be derived by combining a second, third and fourth control point vector. For example, a fourth constructed candidate (Const4) may have a control point vector as in Table 12 below. Meanwhile, only when reference picture information of a second neighboring block is the same as reference picture information of a third and fourth neighboring block, there may be a limit that a control point vector is constructed as in Table 12. Here, reference picture information is as described above.

TABLE 12

| Idx | Control point vector | Control point vector |
|---|---|---|
| 0 | cpMvCorner[1] + cpMvCorner[2] − cpMvCorner[3] | cpMvCorner[2] |
| 1 | cpMvCorner[1] | cpMvCorner[3] |
| 2 | cpMvCorner[2] | cpMvCorner[3] + cpMvCorner[2] − cpMvCorner[1] |

A fifth constructed candidate (Const5) may be derived by combining a first and second control point vector. For example, a fifth constructed candidate (Const4) may have a control point vector as in Table 13 below. Meanwhile, only when reference picture information of a first neighboring block is the same as reference picture information of a second neighboring block, there may be a limit that a control point vector is constructed as in Table 13. Here, reference picture information is as described above.

TABLE 13

| Idx | Control point vector |
|---|---|
| 1 | cpMvCorner[0] |
| 2 | cpMvCorner[1] |

A sixth constructed candidate (Const6) may be derived by combining a first and third control point vector. For example, a sixth constructed candidate (Const6) may have a control point vector as in Table 14 below. Meanwhile, only when reference picture information of a first neighboring block is the same as reference picture information of a third neighboring block, there may be a limit that a control point vector is constructed as in Table 14. Here, reference picture information is as described above.

TABLE 14

| Idx | Control point vector | Control point vector |
|---|---|---|
| 1 | cpMvCorner[0] | cpMvCorner[0] |
| 2 | cpMvCorner[2] | cpMvCorner[1] |

In Table 14, cpMvCorner[1] may be a second control point vector derived based on the first and third control point vector. A second control point vector may be derived based on at least one of a first control point vector, a predetermined difference value or a size of a current/neighboring block. For example, a second control point vector may be derived as in Equation 9 below.

$$cpMvCorner[1][0] = (cpMvCorner[0][0] \ll 7) + ((cpMvCorner[2][1] - cpMvCorner[0][1]) \ll (7 + \text{Log2}(cbHeight/cbWidth))) \quad \text{[Equation 9]}$$

-continued $$cpMvCorner[1][1]=(cpMvCorner[0][1]\ll 7)+((cpMvCorner[2][0]-cpMvCorner[0][0])\ll(7+\mathrm{Log2}(cbHeight/cbWidth)))$$

In the above-described K constructed candidates (ConstK), a value of K does not limit a position or a priority of a constructed candidate arranged in a candidate list.

In addition, all of the first to sixth constructed candidate may be included in the candidate list or only some of them may be included in a candidate list.

For example, when it is determined that a current block uses three control point vectors, only a constructed candidate generated through a combination of three of a first to fourth control point vector may be used. When it is determined that a current block uses two control point vectors, a constructed candidate generated through a combination of at least two of a first to fourth control point vector may be used or a constructed candidate generated through only a combination of two of a first to fourth control point vector may be used.

Alternatively, only some constructed candidates may be included in a candidate list by considering the maximum number of affine candidates included in a candidate list. Here, the maximum number may be determined based on maximum number information signaled from an encoding apparatus or may be variably determined by considering properties of a current block described above. In this case, a K value of a constructed candidate (ConstK) may refer to a priority inserted into a candidate list.

Meanwhile, when the difference value between two control point vectors belonging to the constructed candidate is less than a predetermined threshold, the constructed candidate may not be inserted into the candidate list. The difference value between the two control point vectors may be divided into a horizontal difference value and a vertical difference value. Here, the horizontal difference value may refer to the difference value between the first control point vector 610 and the second control point vector 620, and the vertical difference value may refer to the difference value between the first control point vector 610 and the third control point vector 630. The threshold may mean 0 or a vector of a pre-defined size in the encoding/decoding apparatus.

Figure 7:
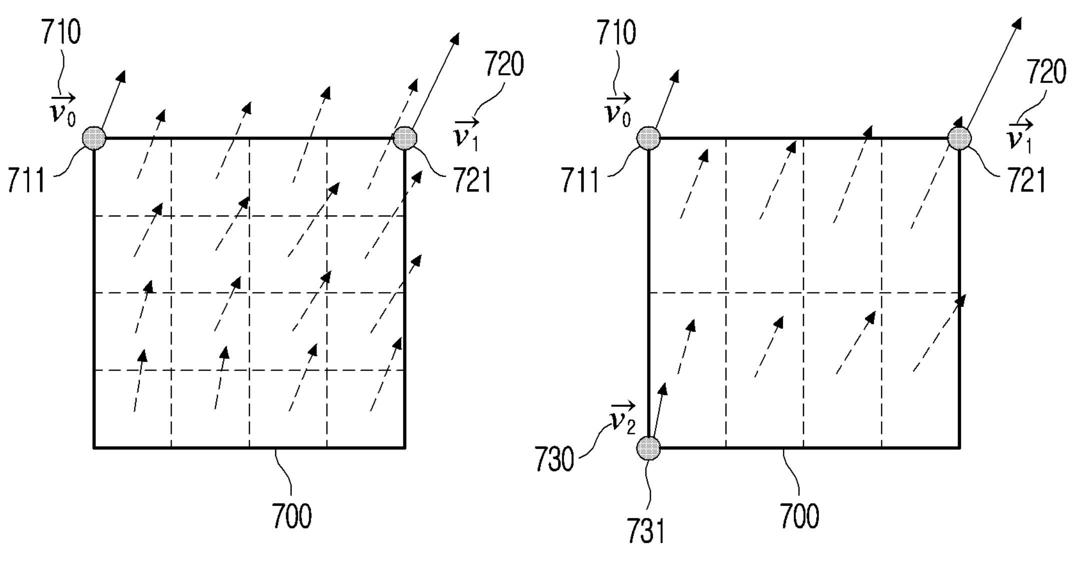
FIG. 7 shows a method of deriving a motion vector in units of subblocks of the current block, as an embodiment of the present disclosure.

FIG. 7 shows a method of deriving a motion vector in units of subblocks of the current block, as an embodiment of the present disclosure.

As described above, a motion vector of a current block may be derived by using a control point vector of a current block. In this case, a current block may be partitioned into a plurality of sub-blocks and a motion vector may be derived in a unit of a sub-block.

The subblock may have the pre-defined size/shape in the encoding/decoding apparatus. For example, the size/shape of the subblock may be square, such as 4×4, 8×8, 16×16, etc., or non-square, such as 2×4, 2×8, 4×8, 4×16, etc. Alternatively, the subblock may be defined as a block where the sum of the width and height is an integer of 8, 12, 16, or more. Alternatively, the subblock may be defined as a block where the product of width and height is an integer of 16, 32, 64, or more.

Alternatively, a size/a shape of a sub-block may be variably derived based on properties of a block described above. For example, when a size of a current block is equal to or greater than a predetermined threshold size, a current block may be partitioned in a unit of a first sub-block (e.g., 8×8, 16×16), and otherwise, a current block may be partitioned in a unit of a second sub-block (e.g., 4×4).

Alternatively, information on the size/shape of the sub-block may be encoded in the encoding apparatus and signaled to the decoding apparatus. The information may indicate at least one of the size or shape of the subblock, and may be signaled at at least one level of sequence, picture, slice, tile, coding tree unit (CTU), or coding unit.

As shown in FIG. 7, the control point representing the current block 700 may include the top-left corner position 711 and the top-right corner position 721. However, the control point is not limited to this, and the control point may include three points: the top-left corner location 711, the top-right corner location 721, and the bottom-left corner location 731, or may further include a plurality of additional points.

When two control points 711 and 721 are used, a motion vector for each sub-block of a current block may be derived by using at least one of a first control point vector 710 corresponding to a first control point 711, a second control point vector 720 corresponding to a second control point 721, a position (x, y) of a sub-block or a size (w or h) of a current block. For example, a motion vector of each sub-block may be derived as in Equation 10 below.

$$\begin{cases} v_x = \frac{(v_{1x}-v_{0x})}{w}x - \frac{(v_{1y}-v_{0y})}{w}y + v_{0x} \\ v_y = \frac{(v_{1y}-v_{0y})}{w}x + \frac{(v_{1x}-v_{0x})}{w}y + v_{0y} \end{cases} \quad \text{[Equation 10]}$$

Meanwhile, when the current block has the modified first control point vector and the third control point vector, the motion vector for each subblock in the current block may be derived using at least one of the modified first control point vector, the third control point vector, the position of the subblock, or the height of the current block.

When three control points are used, a motion vector for each sub-block of a current block may be derived by using at least one of a first control point vector 710 corresponding to a first control point 711, a second control point vector 720 corresponding to a second control point 721, a third control point vector 730 corresponding to a third control point 731, a position (x, y) of a sub-block or a size (w or h) of a current block. In this case, a difference vector between a second control point vector and a first control point vector may be used and a difference vector between a third control point vector and a first control point vector may be used. The difference vector may be calculated for each of a horizontal direction (a x-axis direction) and a vertical direction (a y-axis direction).

Figure 8:
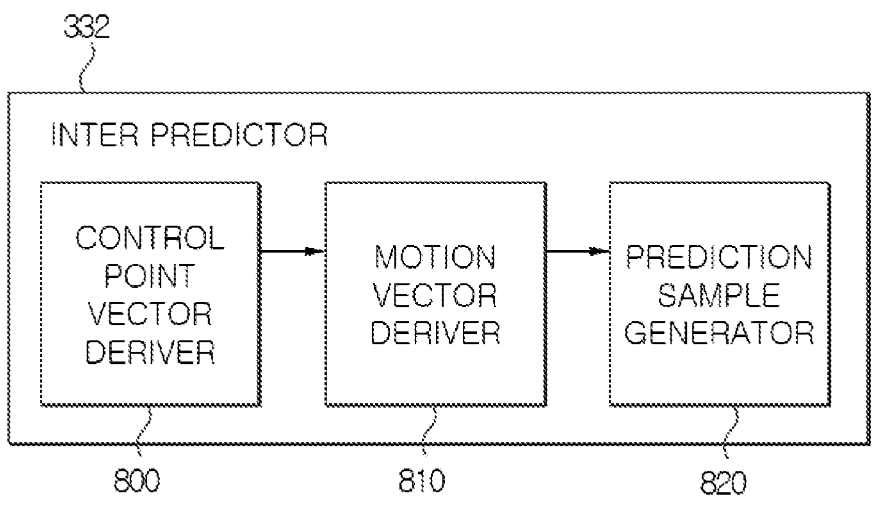
FIG. 8 shows a schematic configuration of an inter predictor 332 that performs inter prediction based on an affine model as an embodiment according to the present disclosure.

FIG. 8 shows a schematic configuration of an inter predictor 332 that performs inter prediction based on an affine model as an embodiment according to the present disclosure.

With reference to FIG. 4, it has been described for the affine model-based inter prediction method performed in the decoding apparatus, and this may be equally performed in the inter predictor 332 of the decoding apparatus. Accordingly, redundant description will be omitted here.

Referring to FIG. 8, the inter predictor unit 332 may include a control point vector deriver 800, a motion vector deriver 810, and a prediction sample generator 820.

The control point vector deriver 800 may generate a candidate list for predicting motion information of the current block. The candidate list may include at least one of an affine candidate or a zero candidate, and the affine candidate may include at least one of an inherited candidate, a constructed candidate, a history-based candidate, an average candidate, or a combined candidate. The method of configuring the candidate list and rearranging it has been described in detail with reference to FIG. 4, and detailed description will be omitted. The control point vector deriver 800 may derive the control point vector of the current block based on the candidate list and the candidate index.

The motion vector deriver 810 may derive the motion vector of the current block based on the derived control point vector. The motion vector may be derived in units of subblocks of the current block, and for this purpose, the current block may be divided into a plurality of subblocks. The method of deriving a motion vector in units of subblocks of the current block is as described with reference to FIG. 7, and a detailed description will be omitted here.

The prediction sample generator 820 may perform inter prediction on the current block using the derived motion vector.

Alternatively, in the case of merge mode, the inter predictor 332 may include a motion information deriver and a prediction sample generator.

The motion information deriver may generate a candidate list for the merge mode of the current block and rearrange it if necessary. This has been described in detail with reference to FIG. 4, and detailed description will be omitted. The motion information deriver may derive motion information of the current block based on the candidate list and the candidate index.

The prediction sample generator may perform inter prediction on the current block using the derived motion information.

Figure 9:
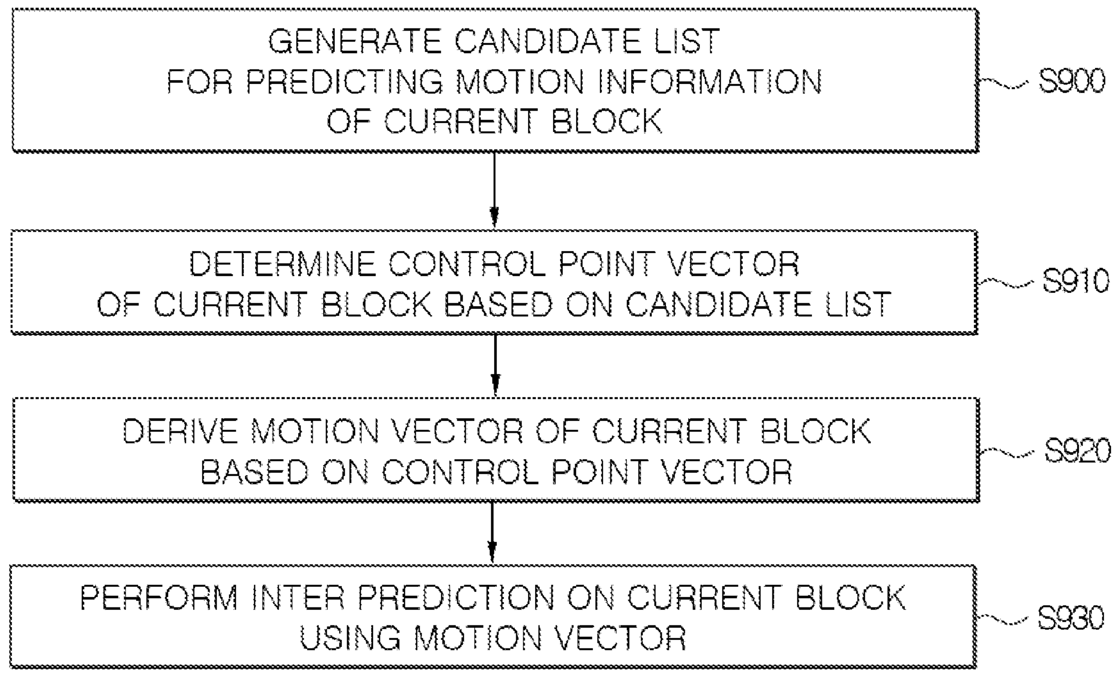
FIG. 9 shows an affine model-based inter prediction method performed by an encoding apparatus as an embodiment according to the present disclosure.

FIG. 9 shows an affine model-based inter prediction method performed by an encoding apparatus as an embodiment according to the present disclosure.

Hereinafter, with reference to FIG. 4, it has been described for the affine model-based inter prediction method performed in the decoding apparatus, which may be equally/similarly applied to the affine model-based inter prediction method performed in the encoding apparatus. Accordingly, redundant description will be omitted here.

Referring to FIG. 9, a candidate list for predicting motion information of the current block may be generated (S900).

The candidate list may include at least one of an affine candidate or a zero candidate, and the affine candidate may include at least one of an inherited candidate, a constructed candidate, a history-based candidate, an average candidate, or a combined candidate. The method of configuring the candidate list and rearranging it has been described in detail with reference to FIG. 4, and detailed description will be omitted.

Referring to FIG. 9, the control point vector of the current block may be determined based on the candidate list (S910).

An optimal candidate may be determined among a plurality of candidates belonging to the candidate list, and a control point vector of the current block may be determined based on the determined optimal candidate. In this case, a candidate index specifying the optimal candidate used to determine the control point vector of the current block may be encoded.

Referring to FIG. 9, the motion vector of the current block may be derived based on the derived control point vector (S920).

The motion vector may be derived in units of subblocks of the current block, and for this, the current block may be divided into a plurality of subblocks. The method of deriving a motion vector in units of subblocks of the current block is as described with reference to FIG. 7, and a detailed description will be omitted here.

Referring to FIG. 9, inter prediction may be performed on the current block using the derived motion vector (S930).

A reference subblock corresponding to each subblock of the current block may be specified based on the motion vector, and a prediction block of the subblock within the current block may be obtained based on the specified reference subblock. A bitstream may be generated by encoding the current block based on the prediction block of the current block.

Alternatively, in the case of merge mode, motion information of the current block may be determined based on one of a plurality of merge candidates included in the candidate list, and inter prediction may be performed based on the determined motion information. A candidate index specifying one of the plurality of merge candidates may be encoded.

Figure 10:
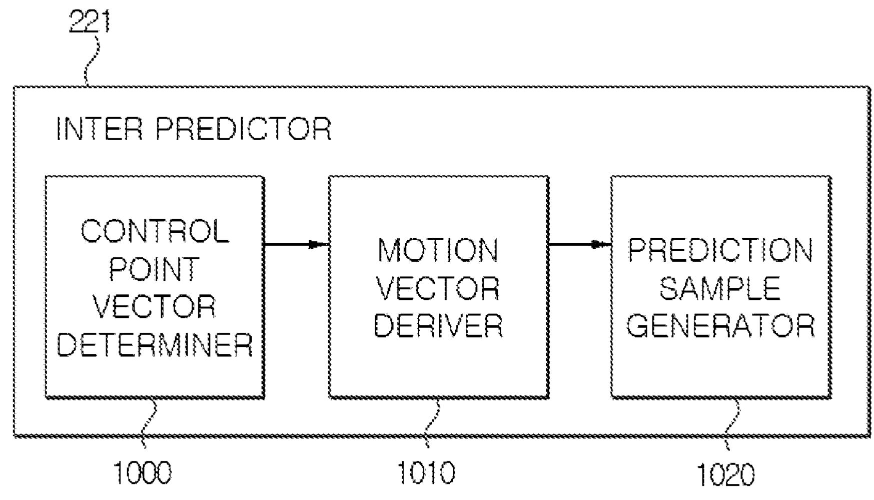
FIG. 10 shows a schematic configuration of an inter predictor 221 that performs inter prediction based on an affine model as an embodiment according to the present disclosure.

FIG. 10 shows a schematic configuration of an inter predictor 221 that performs inter prediction based on an affine model as an embodiment according to the present disclosure.

With reference to FIG. 9, it has been described for the affine model-based inter prediction method performed in the encoding apparatus, and this may be equally performed in the inter predictor 221 of the encoding apparatus. Accordingly, redundant description will be omitted here.

Referring to FIG. 10, the inter predictor 221 may include a control point vector determiner 1000, a motion vector deriver 1010, and a prediction sample generator 1020.

The control point vector determiner 1000 may generate a candidate list for predicting motion information of the current block. The candidate list may include at least one of an affine candidate or a zero candidate, and the affine candidate may include at least one of an inherited candidate, a constructed candidate, a history-based candidate, an average candidate, or a combined candidate. The method of configuring the candidate list and rearranging it has been described in detail with reference to FIG. 4, and detailed description will be omitted.

The control point vector determiner 1000 may determine an optimal candidate among a plurality of candidates included in the candidate list, and may determine a control point vector of the current block based on the determined optimal candidate. In this case, the entropy encoder 240 may encode a candidate index that specifies the optimal candidate used to determine the control point vector of the current block and insert it into the bitstream.

The motion vector deriver 1010 may derive the motion vector of the current block based on the modified control point vector. The motion vector may be derived in units of subblocks of the current block, and for this, the current block may be divided into a plurality of subblocks. The method of deriving a motion vector in units of subblocks of the current block is as described with reference to FIG. 7, and a detailed description will be omitted here.

The prediction sample generator 1020 may perform inter prediction on the current block using the derived motion vector.

Alternatively, in the case of merge mode, the inter predictor 221 may include a motion information determiner and a prediction sample generator.

The motion information determiner may determine motion information of the current block based on one of a plurality of merge candidates included in the candidate list and perform inter prediction based on the determined motion information. In this case, the entropy encoder 240 may encode a candidate index that specifies the optimal merge candidate used to determine the motion vector of the current block and insert it into the bitstream.

The prediction sample generator may perform inter prediction on the current block using the determined motion information.

In the above-described embodiment, methods are described based on a flowchart as a series of steps or blocks, but a corresponding embodiment is not limited to the order of steps, and some steps may occur simultaneously or in different order with other steps as described above. In addition, those skilled in the art may understand that steps shown in a flowchart are not exclusive, and that other steps may be included or one or more steps in a flowchart may be deleted without affecting the scope of embodiments of the present disclosure.

The above-described method according to embodiments of the present disclosure may be implemented in a form of software, and an encoding apparatus and/or a decoding apparatus according to the present disclosure may be included in a device which performs image processing such as a TV, a computer, a smartphone, a set top box, a display device, etc.

In the present disclosure, when embodiments are implemented as software, the above-described method may be implemented as a module (a process, a function, etc.) that performs the above-described function. A module may be stored in a memory and may be executed by a processor. A memory may be internal or external to a processor, and may be connected to a processor by a variety of well-known means. A processor may include an application-specific integrated circuit (ASIC), another chipset, a logic circuit and/or a data processing device. A memory may include a read-only memory (ROM), a random access memory (RAM), a flash memory, a memory card, a storage medium and/or another storage device. In other words, embodiments described herein may be performed by being implemented on a processor, a microprocessor, a controller or a chip. For example, functional units shown in each drawing may be performed by being implemented on a computer, a processor, a microprocessor, a controller or a chip. In this case, information for implementation (ex. information on instructions) or an algorithm may be stored in a digital storage medium.

In addition, a decoding apparatus and an encoding apparatus to which embodiment(s) of the present disclosure are applied may be included in a multimedia broadcasting transmission and reception device, a mobile communication terminal, a home cinema video device, a digital cinema video device, a surveillance camera, a video conversation device, a real-time communication device like a video communication, a mobile streaming device, a storage medium, a camcorder, a device for providing video on demand (VOD) service, an over the top video (OTT) device, a device for providing Internet streaming service, a three-dimensional (3D) video device, a virtual reality (VR) device, an argumente reality (AR) device, a video phone video device, a transportation terminal (ex. a vehicle (including an autonomous vehicle) terminal, an airplane terminal, a ship terminal, etc.) and a medical video device, etc., and may be used to process a video signal or a data signal. For example, an over the top video (OTT) device may include a game console, a blu-ray player, an Internet-connected TV, a home theater system, a smartphone, a tablet PC, a digital video recorder (DVR), etc.

In addition, a processing method to which embodiment(s) of the present disclosure are applied may be produced in a form of a program executed by a computer and may be stored in a computer-readable recording medium. Multimedia data having a data structure according to embodiment(s) of the present disclosure may be also stored in a computer-readable recording medium. The computer-readable recording medium includes all types of storage devices and distributed storage devices that store computer-readable data. The computer-readable recording medium may include, for example, a blu-ray disk (BD), an universal serial bus (USB), ROM, PROM, EPROM, EEPROM, RAM, CD-ROM, a magnetic tape, a floppy disk and an optical media storage device. In addition, the computer-readable recording medium includes media implemented in a form of a carrier wave (e.g., transmission via the Internet). In addition, a bitstream generated by an encoding method may be stored in a computer-readable recording medium or may be transmitted through a wired or wireless communication network.

In addition, embodiment(s) of the present disclosure may be implemented by a computer program product by a program code, and the program code may be executed on a computer by embodiment(s) of the present disclosure. The program code may be stored on a computer-readable carrier.

Figure 11:
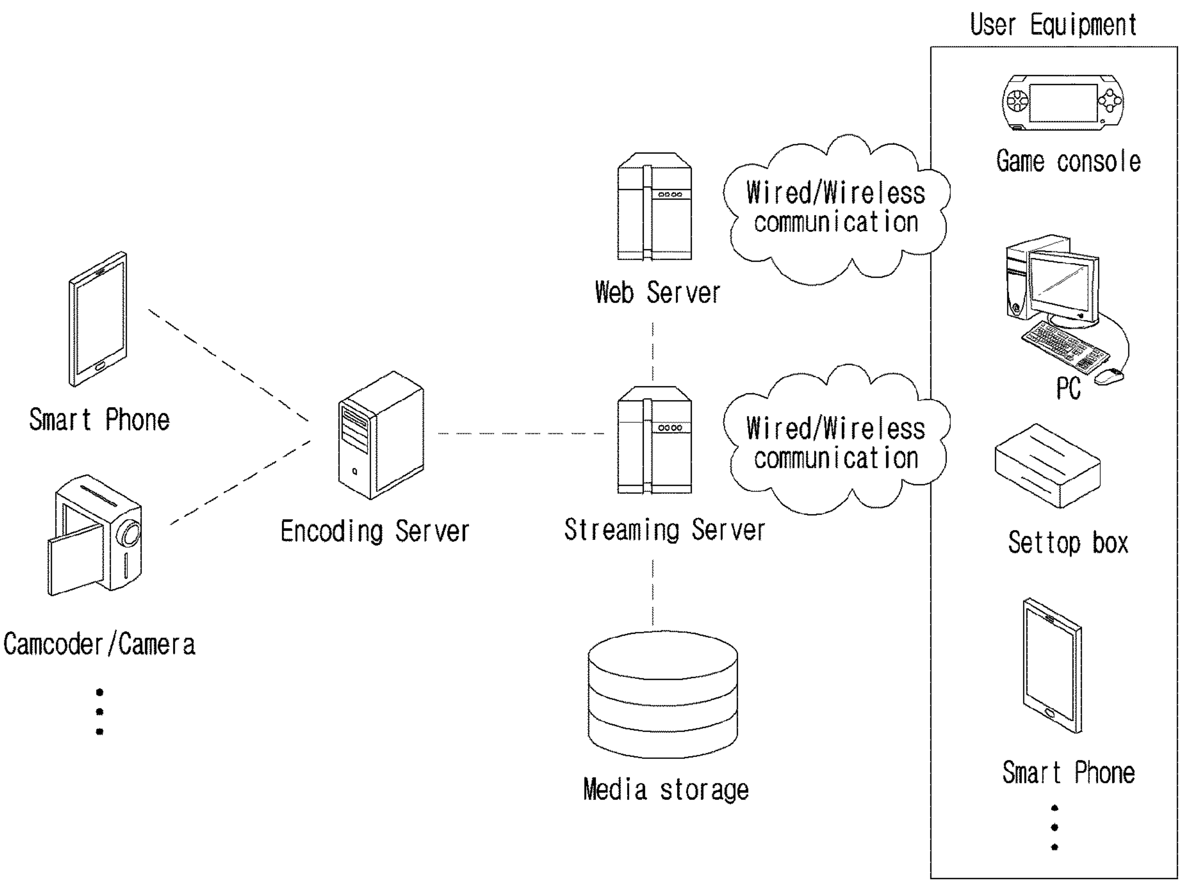
FIG. 11 shows an example of a contents streaming system to which embodiments of the present disclosure may be applied.

FIG. 11 shows an example of a contents streaming system to which embodiments of the present disclosure may be applied.

Referring to FIG. 11, a contents streaming system to which embodiment(s) of the present disclosure are applied may largely include an encoding server, a streaming server, a web server, a media storage, a user device and a multimedia input device.

The encoding server generates a bitstream by compressing contents input from multimedia input devices such as a smartphone, a camera, a camcorder, etc. into digital data and transmits it to the streaming server. As another example, when multimedia input devices such as a smartphone, a camera, a camcorder, etc. directly generate a bitstream, the encoding server may be omitted.

The bitstream may be generated by an encoding method or a bitstream generation method to which embodiment(s) of the present disclosure are applied, and the streaming server may temporarily store the bitstream in a process of transmitting or receiving the bitstream.

The streaming server transmits multimedia data to a user device based on a user's request through a web server, and the web server serves as a medium to inform a user of what service is available. When a user requests desired service from the web server, the web server delivers it to a streaming server, and the streaming server transmits multimedia data to a user. In this case, the contents streaming system may include a separate control server, and in this case, the control server controls a command/a response between each device in the content streaming system.

The streaming server may receive contents from a media storage and/or an encoding server. For example, when contents is received from the encoding server, the contents may be received in real time. In this case, in order to provide smooth streaming service, the streaming server may store the bitstream for a certain period of time.

An example of the user device may include a mobile phone, a smart phone, a laptop computer, a digital broadcasting terminal, a personal digital assistants (PDAs), a portable multimedia players (PMP), a navigation, a slate PC, a Tablet PC, an ultrabook, a wearable device (e.g., a smartwatch, a smart glass, a head mounted display (HMD), a digital TV, a desktop, a digital signage, etc.

Each server in the contents streaming system may be operated as a distributed server, and in this case, data received from each server may be distributed and processed.

The claims set forth herein may be combined in various ways. For example, a technical characteristic of a method claim of the present disclosure may be combined and implemented as a device, and a technical characteristic of a device claim of the present disclosure may be combined and implemented as a method. In addition, a technical characteristic of a method claim of the present disclosure and a technical characteristic of a device claim may be combined and implemented as a device, and a technical characteristic of a method claim of the present disclosure and a technical characteristic of a device claim may be combined and implemented as a method.

The invention claimed is:

1. An image decoding method, comprising:

generating a candidate list of the current block, the candidate list including a plurality of affine candidates, and the plurality of affine candidates including at least one of an inherited candidate, a constructed candidate, or a history-based candidate;

adding an average candidate to the candidate list, the average candidate being generated based on two affine candidates selected from the candidate list according to a predetermined priority order; and performing inter prediction of the current block based on the candidate list including the average candidate, wherein at least one of the inherited candidate, the constructed candidate, or the average candidate included in the candidate list is rearranged based on a template-based cost.

2. The method of claim 1, wherein when the selected two affine candidates have different types of affine models, a type of affine model for the average candidate is determined as a type of affine model for one of the selected two affine candidates.

3. The method of claim 1, wherein generating the candidate list comprises rearranging the plurality of affine candidates belonging to the candidate list based on a type of affine model for at least one of the plurality of affine candidates in the candidate list.

4. The method of claim 1, wherein the average candidate is adaptively added to the candidate list based on at least one of an availability of the two affine candidates, whether reference picture indices between the two affine candidates are the same, or whether reference pictures between the two affine candidates are the same.

5. The method of claim 1, wherein the inherited candidate is configured in the candidate list based on at least one of whether a spatial neighboring block of the current block is a block encoded in an affine mode, a number of inherited candidates pre-included in the candidate list, or a shape of the current block.

6. The method of claim 1, wherein the average candidate is added to the candidate list based on a redundancy check with at least one of the plurality of affine candidates belonging to the candidate list, and wherein the redundancy check is performed based on a type of affine model for the average candidate.

7. The method of claim 1, wherein motion information of the average candidate is determined based on motion information of at least one of the selected two affine candidates, and wherein the motion information includes at least one of a flag indicating whether to apply local illumination compensation or weight information for bidirectional weighted prediction.

8. The method of claim 1, further comprising:

obtaining a candidate index of the current block from a bitstream, wherein the candidate index specifies one of some affine candidates in the candidate list including the average candidate.

9. The method of claim 1, wherein the candidate list further includes a combined candidate, and wherein the combined candidate is generated by combining motion information in an L0 prediction direction for one of the plurality of affine candidates and motion information in an L1 prediction direction for another one of the plurality of affine candidates.

10. An image encoding method, comprising:

generating a candidate list of the current block, the candidate list including a plurality of affine candidates, and the plurality of affine candidates including at least one of an inherited candidate, a constructed candidate, or a history-based candidate;

adding an average candidate to the candidate list, the average candidate being generated based on two affine candidates selected from the candidate list according to a predetermined priority order; and performing inter prediction of the current block based on the candidate list including the average candidate, wherein at least one of the inherited candidate, the constructed candidate, or the average candidate included in the candidate list is rearranged based on a template-based cost.

11. A computer readable storage medium storing a bitstream generated by an image encoding method according to claim 10.

12. A method of transmitting data for image information, comprising:

generating a candidate list of the current block, the candidate list including a plurality of affine candidates, and the plurality of affine candidates including at least one of an inherited candidate, a constructed candidate, or a history-based candidate;

adding an average candidate to the candidate list, the average candidate being generated based on two affine candidates selected from the candidate list according to a predetermined priority order;

performing inter prediction of the current block based on the candidate list including the average candidate;

generating a bitstream by encoding the current block based on a prediction block of the current block generated through the inter prediction; and transmitting the data including the bitstream, wherein at least one of the inherited candidate, the constructed candidate, or the average candidate included in the candidate list is rearranged based on a template-based cost.

* * * * *